US009563663B2

(12) United States Patent
Shukla et al.

(10) Patent No.: US 9,563,663 B2
(45) Date of Patent: Feb. 7, 2017

(54) FAST PATH EVALUATION OF BOOLEAN PREDICATES

(71) Applicant: Oracle International Corporation, Redwood Shores, CA (US)

(72) Inventors: Vikram Shukla, Fremont, CA (US); Anand Srinivasan, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/764,560

(22) Filed: Feb. 11, 2013

(65) Prior Publication Data

US 2014/0095533 A1    Apr. 3, 2014

Related U.S. Application Data

(60) Provisional application No. 61/707,641, filed on Sep. 28, 2012.

(51) Int. Cl.
*G06F 17/30* (2006.01)

(52) U.S. Cl.
CPC ... *G06F 17/30516* (2013.01); *G06F 17/30389* (2013.01); *G06F 17/30424* (2013.01);
(Continued)

(58) Field of Classification Search
CPC .............. G06F 17/30483; G06F 17/30516; G06F 17/30533; G06F 17/30867; G06F 17/30424; G06F 17/30389
(Continued)

(56) References Cited

U.S. PATENT DOCUMENTS 4,996,687 A    2/1991   Hess et al.
5,051,947 A    9/1991   Messenger et al.
(Continued)

FOREIGN PATENT DOCUMENTS

CN    104885077    9/2015
CN    104937591    9/2015
(Continued)

OTHER PUBLICATIONS

Harish D., et al., "Identifying Robust Plans through Plan Diagram Reduction", PVLDB '08, Auckland, New Zealand, Aug. 23-28, 2008, pp. 1124-1140.*
(Continued)

*Primary Examiner* — Robert Stevens
(74) *Attorney, Agent, or Firm* — Kilpatrick Townsend and Stockton LLP

(57) ABSTRACT

Techniques for managing fast path evaluation of Boolean predicates are provided. In some examples, the fast path evaluation may be based at least in part on received queries and/or query statements associated with a database and/or streaming data. In some examples, a first instruction for enabling execution of a subset of logical operators of the query may be determined. The determination may be based at least in part on the logical operators of the query. Additionally, based at least in part on the first instruction, logical instructions for implementing the query may be generated. Further, the logical instructions may be compiled into machine-readable instructions for implementing only the subset of the logical operators of the query.

21 Claims, 8 Drawing Sheets

(52) U.S. Cl.
CPC .. *G06F 17/30442* (2013.01); *G06F 17/30451* (2013.01); *G06F 17/30457* (2013.01); *G06F 17/30477* (2013.01); *G06F 17/30483* (2013.01); *G06F 17/30498* (2013.01); *G06F 17/30548* (2013.01); *G06F 17/30551* (2013.01); *G06F 17/30554* (2013.01); *G06F 17/30557* (2013.01); *G06F 17/30616* (2013.01); *G06F 17/30864* (2013.01); *G06F 17/30958* (2013.01)

(58) Field of Classification Search
USPC ........................................................ 707/769
See application file for complete search history.

(56) References Cited

U.S. PATENT DOCUMENTS

| | | | |
|---|---|---|---|
| 5,339,392 A | 8/1994 | Risberg et al. | |
| 5,495,600 A | 2/1996 | Terry et al. | |
| 5,706,494 A | 1/1998 | Cochrane et al. | |
| 5,802,262 A | 9/1998 | Van De | |
| 5,802,523 A | 9/1998 | Jasuja et al. | |
| 5,822,750 A | 10/1998 | Jou et al. | |
| 5,826,077 A | 10/1998 | Blakeley et al. | |
| 5,850,544 A | 12/1998 | Parvathaneny et al. | |
| 5,857,182 A | 1/1999 | DeMichiel et al. | |
| 5,918,225 A * | 6/1999 | White et al. | |
| 5,920,716 A * | 7/1999 | Johnson et al. | 717/141 |
| 5,937,195 A * | 8/1999 | Ju et al. | 717/156 |
| 5,937,401 A | 8/1999 | Hillegas et al. | |
| 6,006,235 A | 12/1999 | Macdonald et al. | |
| 6,011,916 A | 1/2000 | Moore et al. | |
| 6,041,344 A | 3/2000 | Bodamer et al. | |
| 6,081,801 A * | 6/2000 | Cochrane et al. | |
| 6,092,065 A | 7/2000 | Floratos et al. | |
| 6,108,666 A | 8/2000 | Floratos et al. | |
| 6,112,198 A * | 8/2000 | Lohman et al. | |
| 6,128,610 A | 10/2000 | Srinivasan et al. | |
| 6,158,045 A | 12/2000 | You | |
| 6,212,673 B1 | 4/2001 | House et al. | |
| 6,219,660 B1 | 4/2001 | Haderle et al. | |
| 6,263,332 B1 | 7/2001 | Nasr et al. | |
| 6,278,994 B1 | 8/2001 | Fuh et al. | |
| 6,282,537 B1 | 8/2001 | Madnick et al. | |
| 6,341,281 B1 * | 1/2002 | MacNicol et al. | |
| 6,353,821 B1 | 3/2002 | Gray et al. | |
| 6,367,034 B1 | 4/2002 | Novik et al. | |
| 6,370,537 B1 | 4/2002 | Gilbert et al. | |
| 6,389,436 B1 | 5/2002 | Chakrabarti et al. | |
| 6,397,262 B1 | 5/2002 | Hayden et al. | |
| 6,418,448 B1 | 7/2002 | Sarkar | |
| 6,438,540 B2 | 8/2002 | Nasr et al. | |
| 6,438,559 B1 | 8/2002 | White et al. | |
| 6,439,783 B1 * | 8/2002 | Antoshenkov | |
| 6,449,620 B1 | 9/2002 | Draper et al. | |
| 6,453,314 B1 | 9/2002 | Chan et al. | |
| 6,507,834 B1 * | 1/2003 | Kabra et al. | 707/718 |
| 6,523,102 B1 | 2/2003 | Dye et al. | |
| 6,546,381 B1 | 4/2003 | Subramanian et al. | |
| 6,615,203 B1 * | 9/2003 | Lin et al. | |
| 6,681,343 B1 | 1/2004 | Nakabo | |
| 6,708,186 B1 | 3/2004 | Claborn et al. | |
| 6,718,278 B1 | 4/2004 | Steggles | |
| 6,748,386 B1 | 6/2004 | Li | |
| 6,751,619 B1 | 6/2004 | Rowstron et al. | |
| 6,766,330 B1 | 7/2004 | Chen et al. | |
| 6,785,677 B1 | 8/2004 | Fritchman | |
| 6,826,566 B2 | 11/2004 | Lewak et al. | |
| 6,836,778 B2 | 12/2004 | Manikutty et al. | |
| 6,850,925 B2 * | 2/2005 | Chaudhuri et al. | |
| 6,856,981 B2 | 2/2005 | Wyschogrod et al. | |
| 6,985,904 B1 | 1/2006 | Kaluskar et al. | |
| 6,996,557 B1 * | 2/2006 | Leung et al. | |
| 7,020,696 B1 | 3/2006 | Perry et al. | |
| 7,047,249 B1 | 5/2006 | Vincent | |
| 7,051,034 B1 * | 5/2006 | Ghosh et al. | 707/718 |
| 7,062,749 B2 | 6/2006 | Cyr et al. | |
| 7,080,062 B1 * | 7/2006 | Leung et al. | |
| 7,093,023 B2 | 8/2006 | Lockwood et al. | |
| 7,145,938 B2 | 12/2006 | Takeuchi et al. | |
| 7,146,352 B2 | 12/2006 | Brundage et al. | |
| 7,167,848 B2 * | 1/2007 | Boukouvalas et al. | 706/14 |
| 7,203,927 B2 | 4/2007 | Al-Azzawe et al. | |
| 7,224,185 B2 | 5/2007 | Campbell et al. | |
| 7,225,188 B1 | 5/2007 | Gai et al. | |
| 7,236,972 B2 | 6/2007 | Lewak et al. | |
| 7,305,391 B2 | 12/2007 | Wyschogrod et al. | |
| 7,308,561 B2 | 12/2007 | Cornet et al. | |
| 7,310,638 B1 | 12/2007 | Blair | |
| 7,348,981 B1 | 3/2008 | Buck | |
| 7,376,656 B2 | 5/2008 | Blakeley et al. | |
| 7,383,253 B1 * | 6/2008 | Tsimelzon et al. | 707/610 |
| 7,403,959 B2 | 7/2008 | Nishizawa et al. | |
| 7,430,549 B2 | 9/2008 | Zane et al. | |
| 7,451,143 B2 | 11/2008 | Sharangpani et al. | |
| 7,475,058 B2 | 1/2009 | Kakivaya et al. | |
| 7,483,976 B2 | 1/2009 | Ross | |
| 7,516,121 B2 | 4/2009 | Liu et al. | |
| 7,519,577 B2 | 4/2009 | Brundage et al. | |
| 7,519,962 B2 | 4/2009 | Aman | |
| 7,533,087 B2 | 5/2009 | Liu et al. | |
| 7,546,284 B1 | 6/2009 | Martinez et al. | |
| 7,552,365 B1 | 6/2009 | Marsh et al. | |
| 7,567,953 B2 | 7/2009 | Kadayam et al. | |
| 7,580,946 B2 | 8/2009 | Mansour et al. | |
| 7,587,383 B2 * | 9/2009 | Koo et al. | |
| 7,603,674 B2 | 10/2009 | Cyr et al. | |
| 7,613,848 B2 | 11/2009 | Amini et al. | |
| 7,620,851 B1 | 11/2009 | Leavy et al. | |
| 7,630,982 B2 | 12/2009 | Boyce et al. | |
| 7,634,501 B2 | 12/2009 | Yabloko | |
| 7,636,703 B2 | 12/2009 | Taylor et al. | |
| 7,644,066 B2 | 1/2010 | Krishnaprasad et al. | |
| 7,653,645 B1 | 1/2010 | Stokes | |
| 7,672,964 B1 | 3/2010 | Yan et al. | |
| 7,673,065 B2 | 3/2010 | Srinivasan et al. | |
| 7,676,461 B2 | 3/2010 | Chkodrov et al. | |
| 7,689,622 B2 | 3/2010 | Liu et al. | |
| 7,693,891 B2 | 4/2010 | Stokes et al. | |
| 7,702,629 B2 | 4/2010 | Cytron et al. | |
| 7,702,639 B2 | 4/2010 | Stanley et al. | |
| 7,711,782 B2 | 5/2010 | Kim et al. | |
| 7,716,210 B2 | 5/2010 | Ozcan et al. | |
| 7,739,265 B2 * | 6/2010 | Jain et al. | 707/713 |
| 7,805,445 B2 | 9/2010 | Boyer et al. | |
| 7,814,111 B2 | 10/2010 | Levin | |
| 7,818,313 B1 | 10/2010 | Tsimelzon | |
| 7,823,066 B1 | 10/2010 | Kuramura | |
| 7,827,146 B1 | 11/2010 | De Landstheer et al. | |
| 7,827,190 B2 | 11/2010 | Pandya et al. | |
| 7,844,829 B2 | 11/2010 | Meenakshisundaram | |
| 7,870,124 B2 | 1/2011 | Liu et al. | |
| 7,870,167 B2 | 1/2011 | Lu et al. | |
| 7,877,381 B2 * | 1/2011 | Ewen et al. | 707/719 |
| 7,895,187 B2 * | 2/2011 | Bowman | 707/713 |
| 7,912,853 B2 | 3/2011 | Agrawal | |
| 7,917,299 B2 | 3/2011 | Buhler et al. | |
| 7,930,322 B2 | 4/2011 | Maclennan | |
| 7,945,540 B2 | 5/2011 | Park et al. | |
| 7,953,728 B2 | 5/2011 | Hu et al. | |
| 7,954,109 B1 | 5/2011 | Durham et al. | |
| 7,979,420 B2 * | 7/2011 | Jain et al. | 707/713 |
| 7,984,043 B1 | 7/2011 | Waas | |
| 7,987,204 B2 | 7/2011 | Stokes | |
| 7,988,817 B2 | 8/2011 | Son | |
| 7,991,766 B2 | 8/2011 | Srinivasan et al. | |
| 7,996,388 B2 | 8/2011 | Jain et al. | |
| 8,019,747 B2 | 9/2011 | Srinivasan et al. | |
| 8,032,544 B2 | 10/2011 | Jing et al. | |
| 8,046,747 B2 | 10/2011 | Cyr et al. | |
| 8,073,826 B2 | 12/2011 | Srinivasan et al. | |
| 8,099,400 B2 | 1/2012 | Haub et al. | |
| 8,103,655 B2 | 1/2012 | Srinivasan et al. | |
| 8,122,006 B2 | 2/2012 | de Castro Alves et al. | |

(56) References Cited

U.S. PATENT DOCUMENTS

| | | | |
|---|---|---|---|
| 8,134,184 B2 | 3/2012 | Becker et al. | |
| 8,145,686 B2 | 3/2012 | Raman et al. | |
| 8,145,859 B2 | 3/2012 | Park et al. | |
| 8,155,880 B2 | 4/2012 | Patel et al. | |
| 8,195,648 B2 | 6/2012 | Zabback et al. | |
| 8,204,873 B2* | 6/2012 | Chavan | 707/713 |
| 8,204,875 B2 | 6/2012 | Srinivasan et al. | |
| 8,260,803 B2 | 9/2012 | Hsu et al. | |
| 8,290,776 B2 | 10/2012 | Moriwaki et al. | |
| 8,296,316 B2 | 10/2012 | Jain et al. | |
| 8,307,197 B2* | 11/2012 | Koch, III | G06F 9/264 712/223 |
| 8,307,343 B2 | 11/2012 | Chaudhuri et al. | |
| 8,315,990 B2* | 11/2012 | Barga et al. | 707/690 |
| 8,316,012 B2* | 11/2012 | Abouzied et al. | 707/718 |
| 8,321,450 B2 | 11/2012 | Thatte et al. | |
| 8,346,511 B2 | 1/2013 | Schoning et al. | |
| 8,352,517 B2 | 1/2013 | Park et al. | |
| 8,370,812 B2 | 2/2013 | Feblowitz et al. | |
| 8,386,466 B2 | 2/2013 | Park et al. | |
| 8,387,076 B2 | 2/2013 | Thatte et al. | |
| 8,392,402 B2 | 3/2013 | Mihaila et al. | |
| 8,396,886 B1 | 3/2013 | Tsimelzon | |
| 8,447,744 B2 | 5/2013 | De Castro Alves et al. | |
| 8,458,175 B2 | 6/2013 | Stokes | |
| 8,498,956 B2 | 7/2013 | Srinivasan et al. | |
| 8,521,867 B2 | 8/2013 | Srinivasan et al. | |
| 8,527,458 B2 | 9/2013 | Park et al. | |
| 8,543,558 B2 | 9/2013 | Srinivasan et al. | |
| 8,572,589 B2 | 10/2013 | Cataldo et al. | |
| 8,589,436 B2 | 11/2013 | Srinivasan et al. | |
| 8,676,841 B2 | 3/2014 | Srinivasan et al. | |
| 8,713,049 B2 | 4/2014 | Jain et al. | |
| 8,719,207 B2 | 5/2014 | Ratnam et al. | |
| 8,745,070 B2 | 6/2014 | Krishnamurthy | |
| 8,762,369 B2* | 6/2014 | Macho et al. | 707/722 |
| 8,775,412 B2 | 7/2014 | Day et al. | |
| 9,047,249 B2 | 6/2015 | de Castro Alves et al. | |
| 9,058,360 B2 | 6/2015 | De Castro Alves et al. | |
| 9,098,587 B2 | 8/2015 | Deshmukh et al. | |
| 9,110,945 B2 | 8/2015 | Jain | |
| 9,189,280 B2 | 11/2015 | Park et al. | |
| 9,244,978 B2 | 1/2016 | Alves et al. | |
| 9,256,646 B2 | 2/2016 | Deshmukh et al. | |
| 9,262,258 B2 | 2/2016 | Alves et al. | |
| 9,262,479 B2 | 2/2016 | Deshmukh et al. | |
| 2002/0023211 A1 | 2/2002 | Roth et al. | |
| 2002/0032804 A1 | 3/2002 | Hunt | |
| 2002/0038306 A1 | 3/2002 | Griffin et al. | |
| 2002/0038313 A1 | 3/2002 | Klein et al. | |
| 2002/0049788 A1 | 4/2002 | Lipkin | |
| 2002/0056004 A1 | 5/2002 | Smith et al. | |
| 2002/0073399 A1 | 6/2002 | Golden | |
| 2002/0116362 A1 | 8/2002 | Li et al. | |
| 2002/0116371 A1 | 8/2002 | Dodds et al. | |
| 2002/0133484 A1 | 9/2002 | Chau et al. | |
| 2002/0169788 A1 | 11/2002 | Lee et al. | |
| 2003/0014408 A1 | 1/2003 | Robertson | |
| 2003/0037048 A1 | 2/2003 | Kabra et al. | |
| 2003/0046673 A1 | 3/2003 | Copeland et al. | |
| 2003/0065655 A1 | 4/2003 | Syeda-mahmood | |
| 2003/0065659 A1 | 4/2003 | Agarwal et al. | |
| 2003/0120682 A1* | 6/2003 | Bestgen et al. | 707/104.1 |
| 2003/0135304 A1 | 7/2003 | Sroub et al. | |
| 2003/0200198 A1 | 10/2003 | Chandrasekar et al. | |
| 2003/0212664 A1 | 11/2003 | Breining et al. | |
| 2003/0229652 A1 | 12/2003 | Bakalash et al. | |
| 2003/0236766 A1 | 12/2003 | Fortuna et al. | |
| 2004/0010496 A1 | 1/2004 | Behrendt et al. | |
| 2004/0019592 A1 | 1/2004 | Crabtree | |
| 2004/0024773 A1 | 2/2004 | Stoffel et al. | |
| 2004/0064466 A1 | 4/2004 | Manikutty et al. | |
| 2004/0073534 A1 | 4/2004 | Robson | |
| 2004/0088404 A1 | 5/2004 | Aggarwal | |
| 2004/0117359 A1 | 6/2004 | Snodgrass et al. | |
| 2004/0136598 A1 | 7/2004 | Le Leannec et al. | |
| 2004/0151382 A1 | 8/2004 | Stellenberg et al. | |
| 2004/0153329 A1 | 8/2004 | Casati et al. | |
| 2004/0167864 A1 | 8/2004 | Wang et al. | |
| 2004/0168107 A1 | 8/2004 | Sharp et al. | |
| 2004/0177053 A1 | 9/2004 | Donoho et al. | |
| 2004/0201612 A1 | 10/2004 | Hild et al. | |
| 2004/0205082 A1* | 10/2004 | Fontoura et al. | 707/101 |
| 2004/0220896 A1* | 11/2004 | Finlay et al. | 707/1 |
| 2004/0220912 A1 | 11/2004 | Manikutty et al. | |
| 2004/0220927 A1 | 11/2004 | Murthy et al. | |
| 2004/0243590 A1 | 12/2004 | Gu et al. | |
| 2004/0267760 A1 | 12/2004 | Brundage et al. | |
| 2004/0268314 A1 | 12/2004 | Kollman et al. | |
| 2005/0010896 A1 | 1/2005 | Meliksetian et al. | |
| 2005/0055338 A1 | 3/2005 | Warner et al. | |
| 2005/0065949 A1 | 3/2005 | Warner et al. | |
| 2005/0096124 A1 | 5/2005 | Stronach | |
| 2005/0097128 A1 | 5/2005 | Ryan et al. | |
| 2005/0108368 A1 | 5/2005 | Mohan | |
| 2005/0120016 A1 | 6/2005 | Midgley | |
| 2005/0154740 A1 | 7/2005 | Day et al. | |
| 2005/0174940 A1 | 8/2005 | Iny | |
| 2005/0177579 A1 | 8/2005 | Blakeley et al. | |
| 2005/0192921 A1 | 9/2005 | Chaudhuri et al. | |
| 2005/0204340 A1 | 9/2005 | Ruminer et al. | |
| 2005/0229158 A1 | 10/2005 | Thusoo et al. | |
| 2005/0273352 A1 | 12/2005 | Moffat et al. | |
| 2005/0273450 A1 | 12/2005 | McMillen et al. | |
| 2005/0289125 A1 | 12/2005 | Liu et al. | |
| 2006/0007308 A1 | 1/2006 | Ide et al. | |
| 2006/0015482 A1 | 1/2006 | Beyer et al. | |
| 2006/0031204 A1 | 2/2006 | Liu et al. | |
| 2006/0047696 A1* | 3/2006 | Larson et al. | 707/103 R |
| 2006/0064487 A1 | 3/2006 | Ross | |
| 2006/0080646 A1 | 4/2006 | Aman | |
| 2006/0085592 A1 | 4/2006 | Ganguly et al. | |
| 2006/0089939 A1 | 4/2006 | Broda et al. | |
| 2006/0100957 A1 | 5/2006 | Buttler et al. | |
| 2006/0100969 A1 | 5/2006 | Wang et al. | |
| 2006/0106786 A1 | 5/2006 | Day et al. | |
| 2006/0106797 A1 | 5/2006 | Srinivasa et al. | |
| 2006/0129554 A1 | 6/2006 | Suyama et al. | |
| 2006/0155719 A1 | 7/2006 | Mihaeli et al. | |
| 2006/0167704 A1 | 7/2006 | Nicholls et al. | |
| 2006/0167856 A1 | 7/2006 | Angele et al. | |
| 2006/0212441 A1 | 9/2006 | Tang et al. | |
| 2006/0224576 A1 | 10/2006 | Liu et al. | |
| 2006/0230029 A1 | 10/2006 | Yan | |
| 2006/0235840 A1 | 10/2006 | Manikutty et al. | |
| 2006/0242180 A1 | 10/2006 | Graf et al. | |
| 2006/0282429 A1 | 12/2006 | Hernandez-Sherrington et al. | |
| 2006/0294095 A1 | 12/2006 | Berk et al. | |
| 2007/0016467 A1 | 1/2007 | John et al. | |
| 2007/0022092 A1 | 1/2007 | Nishizawa et al. | |
| 2007/0039049 A1 | 2/2007 | Kupferman et al. | |
| 2007/0050340 A1 | 3/2007 | Von Kaenel et al. | |
| 2007/0076314 A1 | 4/2007 | Rigney | |
| 2007/0118600 A1 | 5/2007 | Arora | |
| 2007/0136239 A1 | 6/2007 | Lee et al. | |
| 2007/0136254 A1 | 6/2007 | Choi et al. | |
| 2007/0156787 A1 | 7/2007 | MacGregor | |
| 2007/0156964 A1 | 7/2007 | Sistla | |
| 2007/0192301 A1 | 8/2007 | Posner | |
| 2007/0198479 A1* | 8/2007 | Cai et al. | 707/3 |
| 2007/0214171 A1* | 9/2007 | Behnen | G06F 8/10 |
| 2007/0226188 A1 | 9/2007 | Johnson et al. | |
| 2007/0226239 A1 | 9/2007 | Johnson et al. | |
| 2007/0271280 A1 | 11/2007 | Chandasekaran | |
| 2007/0294217 A1 | 12/2007 | Chen et al. | |
| 2008/0005093 A1 | 1/2008 | Liu et al. | |
| 2008/0010093 A1 | 1/2008 | LaPlante et al. | |
| 2008/0010241 A1 | 1/2008 | Mcgoveran | |
| 2008/0016095 A1 | 1/2008 | Bhatnagar et al. | |
| 2008/0028095 A1 | 1/2008 | Lang et al. | |
| 2008/0033914 A1* | 2/2008 | Cherniack et al. | 707/3 |
| 2008/0034427 A1 | 2/2008 | Cadambi et al. | |
| 2008/0046401 A1 | 2/2008 | Lee et al. | |
| 2008/0071904 A1 | 3/2008 | Schuba et al. | |

(56) References Cited

U.S. PATENT DOCUMENTS

| | | |
|---|---|---|
| 2008/0077570 A1 | 3/2008 | Tang et al. |
| 2008/0077587 A1 | 3/2008 | Wyschogrod et al. |
| 2008/0077780 A1 | 3/2008 | Zingher |
| 2008/0082484 A1 | 4/2008 | Averbuch et al. |
| 2008/0082514 A1 | 4/2008 | Khorlin et al. |
| 2008/0086321 A1 | 4/2008 | Walton |
| 2008/0098359 A1 | 4/2008 | Ivanov et al. |
| 2008/0110397 A1 | 5/2008 | Son |
| 2008/0114787 A1 | 5/2008 | Kashiyama et al. |
| 2008/0120283 A1* | 5/2008 | Liu et al. ............................. 707/4 |
| 2008/0120321 A1 | 5/2008 | Liu et al. |
| 2008/0162583 A1 | 7/2008 | Brown et al. |
| 2008/0195577 A1 | 8/2008 | Fan et al. |
| 2008/0235298 A1 | 9/2008 | Lin et al. |
| 2008/0243451 A1 | 10/2008 | Feblowitz et al. |
| 2008/0243675 A1 | 10/2008 | Parsons et al. |
| 2008/0250073 A1 | 10/2008 | Nori et al. |
| 2008/0255847 A1 | 10/2008 | Moriwaki et al. |
| 2008/0263039 A1 | 10/2008 | Van Lunteren |
| 2008/0270764 A1 | 10/2008 | McMillen et al. |
| 2008/0281782 A1 | 11/2008 | Agrawal |
| 2008/0301086 A1 | 12/2008 | Gupta |
| 2008/0301124 A1* | 12/2008 | Alves et al. ........................ 707/5 |
| 2008/0301125 A1* | 12/2008 | Alves et al. ........................ 707/5 |
| 2008/0301135 A1 | 12/2008 | Alves et al. |
| 2008/0301256 A1 | 12/2008 | Mcwilliams et al. |
| 2008/0313131 A1* | 12/2008 | Friedman et al. ................. 707/2 |
| 2009/0006320 A1 | 1/2009 | Ding et al. |
| 2009/0006346 A1 | 1/2009 | Kanthi et al. |
| 2009/0007098 A1 | 1/2009 | Chevrette et al. |
| 2009/0019045 A1 | 1/2009 | Amir et al. |
| 2009/0024622 A1 | 1/2009 | Chkodrov et al. |
| 2009/0043729 A1 | 2/2009 | Liu et al. |
| 2009/0070355 A1 | 3/2009 | Cadarette et al. |
| 2009/0070785 A1 | 3/2009 | Alvez et al. |
| 2009/0070786 A1 | 3/2009 | Alves et al. |
| 2009/0076899 A1 | 3/2009 | Gbodimowo |
| 2009/0088962 A1 | 4/2009 | Jones |
| 2009/0100029 A1 | 4/2009 | Jain et al. |
| 2009/0106189 A1 | 4/2009 | Jain et al. |
| 2009/0106190 A1 | 4/2009 | Srinivasan et al. |
| 2009/0106198 A1* | 4/2009 | Srinivasan ........ G06F 17/30516 |
| 2009/0106214 A1 | 4/2009 | Jain et al. |
| 2009/0106215 A1 | 4/2009 | Jain et al. |
| 2009/0106218 A1 | 4/2009 | Srinivasan et al. |
| 2009/0106321 A1 | 4/2009 | Das et al. |
| 2009/0106440 A1 | 4/2009 | Srinivasan et al. |
| 2009/0112802 A1 | 4/2009 | Srinivasan et al. |
| 2009/0112803 A1 | 4/2009 | Srinivasan et al. |
| 2009/0112853 A1 | 4/2009 | Nishizawa et al. |
| 2009/0125550 A1 | 5/2009 | Barga et al. |
| 2009/0125916 A1 | 5/2009 | Lu et al. |
| 2009/0132503 A1* | 5/2009 | Sun .................... G06F 17/30427 |
| 2009/0133041 A1 | 5/2009 | Rahman et al. |
| 2009/0144696 A1 | 6/2009 | Andersen |
| 2009/0172014 A1 | 7/2009 | Huetter |
| 2009/0182779 A1 | 7/2009 | Johnson |
| 2009/0187584 A1 | 7/2009 | Johnson et al. |
| 2009/0192981 A1 | 7/2009 | Papaemmanouil et al. |
| 2009/0216747 A1 | 8/2009 | Li et al. |
| 2009/0216860 A1 | 8/2009 | Li et al. |
| 2009/0222730 A1 | 9/2009 | Wixson et al. |
| 2009/0228431 A1 | 9/2009 | Dunagan et al. |
| 2009/0228434 A1 | 9/2009 | Krishnamurthy et al. |
| 2009/0245236 A1 | 10/2009 | Scott et al. |
| 2009/0248749 A1 | 10/2009 | Gu et al. |
| 2009/0254522 A1 | 10/2009 | Chaudhuri et al. |
| 2009/0257314 A1 | 10/2009 | Davis et al. |
| 2009/0265324 A1 | 10/2009 | Mordvinov et al. |
| 2009/0271529 A1 | 10/2009 | Kashiyama et al. |
| 2009/0282021 A1 | 11/2009 | Bennett et al. |
| 2009/0293046 A1 | 11/2009 | Cheriton |
| 2009/0300093 A1 | 12/2009 | Griffiths et al. |
| 2009/0300181 A1 | 12/2009 | Marques |
| 2009/0300580 A1 | 12/2009 | Heyhoe et al. |
| 2009/0300615 A1 | 12/2009 | Andrade et al. |
| 2009/0313198 A1 | 12/2009 | Kudo et al. |
| 2009/0319501 A1 | 12/2009 | Goldstein et al. |
| 2009/0327102 A1 | 12/2009 | Maniar et al. |
| 2009/0327257 A1 | 12/2009 | Abouzeid et al. |
| 2010/0017379 A1 | 1/2010 | Naibo et al. |
| 2010/0017380 A1 | 1/2010 | Naibo et al. |
| 2010/0023498 A1 | 1/2010 | Dettinger et al. |
| 2010/0036803 A1 | 2/2010 | Vemuri et al. |
| 2010/0036831 A1 | 2/2010 | Vemuri |
| 2010/0049710 A1 | 2/2010 | Young, Jr. et al. |
| 2010/0057663 A1 | 3/2010 | Srinivasan et al. |
| 2010/0057727 A1 | 3/2010 | Srinivasan et al. |
| 2010/0057735 A1 | 3/2010 | Srinivasan et al. |
| 2010/0057736 A1 | 3/2010 | Srinivasan et al. |
| 2010/0057737 A1* | 3/2010 | Srinivasan et al. ................ 707/6 |
| 2010/0094838 A1 | 4/2010 | Kozak |
| 2010/0106710 A1 | 4/2010 | Nishizawa et al. |
| 2010/0106946 A1 | 4/2010 | Imaki et al. |
| 2010/0125574 A1 | 5/2010 | Navas |
| 2010/0125584 A1 | 5/2010 | Navas |
| 2010/0138405 A1 | 6/2010 | Mihaila |
| 2010/0161589 A1 | 6/2010 | Nica et al. |
| 2010/0223305 A1 | 9/2010 | Park et al. |
| 2010/0223437 A1 | 9/2010 | Park et al. |
| 2010/0223606 A1 | 9/2010 | Park et al. |
| 2010/0250572 A1 | 9/2010 | Chen |
| 2010/0293135 A1 | 11/2010 | Candea et al. |
| 2010/0312756 A1* | 12/2010 | Zhang et al. .................. 707/693 |
| 2010/0318652 A1 | 12/2010 | Samba |
| 2010/0332401 A1 | 12/2010 | Prahlad et al. |
| 2011/0004621 A1 | 1/2011 | Kelley et al. |
| 2011/0016160 A1 | 1/2011 | Zhang et al. |
| 2011/0022618 A1 | 1/2011 | Thatte et al. |
| 2011/0023055 A1* | 1/2011 | Thatte et al. .................. 719/328 |
| 2011/0029484 A1 | 2/2011 | Park et al. |
| 2011/0029485 A1 | 2/2011 | Park et al. |
| 2011/0040746 A1 | 2/2011 | Handa et al. |
| 2011/0055192 A1 | 3/2011 | Tang et al. |
| 2011/0055197 A1* | 3/2011 | Chavan ......................... 707/713 |
| 2011/0093162 A1 | 4/2011 | Nielsen et al. |
| 2011/0105857 A1 | 5/2011 | Zhang et al. |
| 2011/0161321 A1 | 6/2011 | De Castro et al. |
| 2011/0161328 A1* | 6/2011 | Park et al. ..................... 707/743 |
| 2011/0161352 A1 | 6/2011 | De Castro et al. |
| 2011/0161356 A1* | 6/2011 | de Castro Alves et al. .. 707/769 |
| 2011/0161397 A1 | 6/2011 | Bekiares et al. |
| 2011/0173231 A1 | 7/2011 | Drissi et al. |
| 2011/0173235 A1 | 7/2011 | Aman et al. |
| 2011/0196839 A1 | 8/2011 | Smith et al. |
| 2011/0196891 A1* | 8/2011 | de Castro Alves et al. .. 707/769 |
| 2011/0246445 A1 | 10/2011 | Mishra |
| 2011/0270879 A1 | 11/2011 | Srinivasan et al. |
| 2011/0282812 A1 | 11/2011 | Chandramouli et al. |
| 2011/0302164 A1 | 12/2011 | Krishnamurthy et al. |
| 2011/0313844 A1 | 12/2011 | Chandramouli et al. |
| 2011/0314019 A1 | 12/2011 | Jimenez Peris et al. |
| 2011/0321057 A1 | 12/2011 | Mejdrich et al. |
| 2012/0016866 A1 | 1/2012 | Dunagan |
| 2012/0041934 A1 | 2/2012 | Srinivasan et al. |
| 2012/0072455 A1 | 3/2012 | Jain et al. |
| 2012/0130963 A1 | 5/2012 | Luo et al. |
| 2012/0131139 A1 | 5/2012 | Siripurapu et al. |
| 2012/0166417 A1 | 6/2012 | Chandramouli et al. |
| 2012/0166421 A1 | 6/2012 | Cammert et al. |
| 2012/0166469 A1* | 6/2012 | Cammert et al. ............. 707/769 |
| 2012/0191697 A1* | 7/2012 | Sherman et al. ............. 707/717 |
| 2012/0233107 A1 | 9/2012 | Roesch et al. |
| 2012/0259910 A1 | 10/2012 | Andrade et al. |
| 2012/0278473 A1 | 11/2012 | Griffiths |
| 2012/0284420 A1 | 11/2012 | Shukla et al. |
| 2012/0290715 A1 | 11/2012 | Dinger et al. |
| 2012/0291049 A1 | 11/2012 | Park et al. |
| 2012/0324453 A1 | 12/2012 | Chandramouli et al. |
| 2013/0014088 A1 | 1/2013 | Park et al. |
| 2013/0031567 A1 | 1/2013 | Nano et al. |
| 2013/0046725 A1 | 2/2013 | Cammert et al. |
| 2013/0117317 A1 | 5/2013 | Wolf |
| 2013/0144866 A1 | 6/2013 | Jerzak et al. |

(56) References Cited

U.S. PATENT DOCUMENTS

| | | | |
|---|---|---|---|
| 2013/0191370 A1* | 7/2013 | Chen et al. | 707/718 |
| 2013/0262399 A1 | 10/2013 | Eker et al. | |
| 2013/0332240 A1 | 12/2013 | Patri et al. | |
| 2014/0082013 A1 | 3/2014 | Wolf et al. | |
| 2014/0095444 A1 | 4/2014 | Deshmukh et al. | |
| 2014/0095445 A1 | 4/2014 | Deshmukh et al. | |
| 2014/0095446 A1 | 4/2014 | Deshmukh et al. | |
| 2014/0095447 A1 | 4/2014 | Deshmukh et al. | |
| 2014/0095462 A1 | 4/2014 | Park et al. | |
| 2014/0095471 A1 | 4/2014 | Deshmukh et al. | |
| 2014/0095473 A1 | 4/2014 | Srinivasan et al. | |
| 2014/0095483 A1 | 4/2014 | Toillion et al. | |
| 2014/0095525 A1 | 4/2014 | Hsiao et al. | |
| 2014/0095529 A1 | 4/2014 | Deshmukh et al. | |
| 2014/0095535 A1 | 4/2014 | Deshmukh et al. | |
| 2014/0095537 A1 | 4/2014 | Park et al. | |
| 2014/0095540 A1 | 4/2014 | Hsiao et al. | |
| 2014/0095541 A1 | 4/2014 | Herwadkar et al. | |
| 2014/0095543 A1 | 4/2014 | Hsiao et al. | |
| 2014/0136514 A1 | 5/2014 | Jain et al. | |
| 2014/0156683 A1 | 6/2014 | de Castro Alves | |
| 2014/0172506 A1 | 6/2014 | Parsell et al. | |
| 2014/0172914 A1* | 6/2014 | Elnikety et al. | 707/774 |
| 2014/0201225 A1 | 7/2014 | Deshmukh et al. | |
| 2014/0201355 A1 | 7/2014 | Bishnoi et al. | |
| 2014/0236983 A1 | 8/2014 | Alves et al. | |
| 2014/0237289 A1 | 8/2014 | de Castro Alves et al. | |
| 2014/0358959 A1 | 12/2014 | Bishnoi et al. | |
| 2014/0379712 A1 | 12/2014 | Lafuente Alvarez | |
| 2015/0156241 A1 | 6/2015 | Shukla et al. | |
| 2015/0161214 A1 | 6/2015 | Kali et al. | |
| 2015/0227415 A1 | 8/2015 | Alves et al. | |
| 2015/0363464 A1 | 12/2015 | Alves et al. | |
| 2015/0381712 A1 | 12/2015 | De Castro Alves et al. | |
| 2016/0034311 A1 | 2/2016 | Park et al. | |

FOREIGN PATENT DOCUMENTS

| | | |
|---|---|---|
| EP | 1 241 589 A2 | 9/2002 |
| EP | 2474922 | 7/2012 |
| EP | 2946314 | 11/2015 |
| EP | 2946527 | 11/2015 |
| EP | 2959408 | 12/2015 |
| JP | 2002-251233 A | 9/2002 |
| JP | 2007-328716 A | 12/2007 |
| JP | 2008-541225 A | 11/2008 |
| JP | 2009-134689 A | 6/2009 |
| JP | 2010-108073 A | 5/2010 |
| JP | 2011-039818 A | 2/2011 |
| JP | 2015536001 | 12/2015 |
| JP | 2016500167 | 1/2016 |
| WO | 00/49533 A2 | 8/2000 |
| WO | WO00/49533 | 8/2000 |
| WO | 0118712 | 3/2001 |
| WO | 10/59602 A1 | 8/2001 |
| WO | 01/65418 A1 | 9/2001 |
| WO | 03/030031 A2 | 4/2003 |
| WO | 2007122347 | 11/2007 |
| WO | WO2009/119811 A1 | 10/2009 |
| WO | 2012/037511 A1 | 3/2012 |
| WO | 2012050582 | 4/2012 |
| WO | 2012/154408 A1 | 11/2012 |
| WO | 2012/158360 A1 | 11/2012 |
| WO | 2015191120 | 12/2015 |

OTHER PUBLICATIONS

Babu, Shivnath, et al., "Continuous Queries over Data Streams", SIGMOD Record, vol. 30, No. 3, Sep. 2001, pp. 109-120.*

Stillger, Michael, et al., "LEO—DB2's LEarning Optimizer", Proc. of the VLDB, Roma, Italy, Sep. 2001, pp. 19-28.*

Rao, Jun, et al., "Compiled Query Execution Engine using JVM", ICDE '06, Atlanta, GA, Apr. 3-7, 2006, 12 pages.*

Microsoft Computer Dictionary, 5th Edition, Microsoft Press, Redmond, WA, © 2002, pp. 238-239 and 529.*

"Bottom-up parsing", Wikipedia, downloaded from: http://en.wikipedia.org/wiki/Bottom-up_parsing on Sep. 8, 2014, pp. 1-2.*

"Branch Predication", Wikipedia, downloaded from: http://en.wikipedia.org/wiki/Branch_predication on Sep. 8, 2014, pp. 1-4.*

Dewson, Robin, Beginning SQL Server 2008 for Developers: From Novice to Professional, APress, Berkeley, CA, © 2008, pp. 337-349 and 418-438.* de Castro Alves, Alexandre, "A General Extension System for Event Processing Languages", DEBS '11, New York, NY, Jul. 11-15, 2011, pp. 1-9.*

Arasu, Arvind, et al., "The CQL continuous query language: semantic foundations and query execution", The VLDB Journal, vol. 15, Issue 2, Jun. 2006, pp. 121-142.*

Takenaka, Takashi, et al., "A Scalable Complex Event Processing Framework for Combination of SQL-Based Continuous Queries and C/C++ Functions", FPL 2012, Oslo, Norway, Aug. 29-31, 2012, pp. 237-242.*

Tomàs, Jordi Creus, et al., "RoSeS: A Continuous Content-Based Query Engine for RSS Feeds", DEXA 2011, Toulouse, France, Sep. 2, 2011, pp. 203-218.*

Arasu, Arvind, et al., "CQL: A Language for Continuous Queries over Streams and Relations", DBPL 2003, LNCS 2921, Springer-Verlag, Berlin, Germany, © 2004, pp. 1-19.*

"Oracle Complex Event Processing—EPL Language Reference, 11g Release 1 (11.1.4.0)", E14304-02, Jan. 2011, 80 pages.*

Purvee, Edwin Ralph, "Optimizing SPARQLeR Using Short Circuit Evaluation of Filter Clauses", Master of Science Thesis, Univ. of Georgia, Athens, GA, © 2009, 66 pages.*

Josifovsky, Vanja, et al., "Querying XML Streams", The VLDB Journal, vol. 14, © 2005, pp. 197-210.*

Weidong, Yang, et al., "LeoXSS: An Efficient XML Stream System for Processing Complex XPaths", CIT 2006, Seoul, Korea, © 2006, 6 pages.*

"Data stream management system", Wikipedia, downloaded from en.wikipedia.org/wiki/Data_stream_management_system on Sep. 23, 2015, pp. 1-5.*

Hirzel, Martin, et al., "SPL Stream Processing Language Report", IBM Research Report RC24897 (W0911-044), IBM Research Division, Thomas J. Watson Research center, Yorktown Heights, NY, Nov. 5, 2009, 19 pages.*

Tomàs, Jordi Creus, et al., "RoSeS: A Continuous Content-Based Query Engine for RSS Feeds", DEXA 2011, Part II, LNCS 6861, Springer-Verlag, Berlin, Germany, © 2011, pp. 203-218.*

Mahlke, Scott A., et al., "A Comparison of Full and Partial Predicated Execution Support for ILP Processors", ICSA '95, Santa Margherita Ligure, Italy, © 1995, pp. 138-149.*

U.S. Appl. No. 12/548,281, Final Office Action mailed on Oct. 10, 2013, 21 pages.

U.S. Appl. No. 12/548,290, Notice of Allowance mailed on Sep. 11, 2013, 6 pages.

U.S. Appl. No. 12/949,081, Final Office Action mailed on Aug. 27, 2013, 13 pages.

U.S. Appl. No. 13/089,556, Final Office Action mailed on Aug. 29, 2013, 10 pages.

U.S. Appl. No. 13/177,748, Non-Final Office Action mailed on Aug. 30, 2013, 24 pages.

U.S. Appl. No. 13/193,377, Notice of Allowance mailed on Aug. 30, 2013, 19 pages.

Oracle™ Fusion Middleware CQL Language Reference, 11g Release 1 (11.1.1.6.3) E12048-10, Aug. 2012, pp. 6-1 to 6-12.

Oracle™ Complex Event Processing CQL Language Reference, 11g Release 1 (11.1.1.4.0) E12048-04, Jan. 2011, pp. 6.1 to 6.12.

Oracle™ Complex Event Processing CQL Language Reference, 11g Release 1 (11.1.1) E12048-03, Apr. 2010, sections 18-4 to 18.4.2.

Pattern Recognition With MATCH_RECOGNIZE, Oracle™ Complex Event Processing CQL Language Reference, 11g Release 1 (11.1.1) E12048-01, May 2009, pp. 15.1 to 15.20.

Supply Chain Event Management: Real-Time Supply Chain Event Management, product information Manhattan Associates, 2009-2012.

(56) References Cited

OTHER PUBLICATIONS

U.S. Appl. No. 11/601,415, Non-Final Office Action mailed on Dec. 11, 2013, 58 pages.
U.S. Appl. No. 12/396,464, Non Final Office Action mailed on Dec. 31, 2013, 16 pages.
U.S. Appl. No. 13/089,556, Non-Final Office Action mailed on Jan. 9, 2014, 14 Pages.
Chandramouli et al., High-Performance Dynamic Pattern Matching over Disordered Streams, Proceedings of the VLDB Endowment, vol. 3 Issue 1-2, Sep. 2010, pp. 220-231.
Chapple, Combining Query Results with the UNION Command, ask.com Computing Databases, downloaded from: http://databases.about.com/od/sql/a/union.htm.
Chui, WebSphere Application Server V6.1—Class loader problem determination, IBM.com, 2007.
Fantozzi, A Strategic Approach to Supply Chain Event Management, student submission for Masters Degree, Massachusetts Institute of Technology, Jun. 2003.
Komazec et al., Towards Efficient Schema-Enhanced Pattern Matching over RDF Data Streams, Proceedings of the 1st International Workshop on Ordering and Reasoning (OrdRing 2011), Bonn, Germany, Oct. 2011.
Ogrodnek, Custom UDFs and hive, Bizo development blog http://dev.bizo.com, Jun. 23, 2009, 2 pages.
Pradhan, Implementing and Configuring SAP® Event Management, Galileo Press, 2010, pp. 17-21.
Wilson et al., SAP Event Management, an Overview, Q Data USA, Inc., 2009.
Oracle Application Server, Enterprise Deployment Guide, 10g Release 3 (10.1.3.2.0), B32125-02, Oracle, Apr. 2007, 120 pages.
Oracle Database, SQL Language Reference 11 g Release 1 (11.1), B28286-02, Oracle, Sep. 2007, 1496 pages.
Esper Reference Documentation, Copyright 2007, Ver. 1.12.0, 2007, 158 pages.
Stream Query Repository: Online Auctions, at URL: http://www-db.stanford.edu/stream/sgr/onauc.html#queryspecsend, Dec. 2, 2002, 2 pages.
Esper Reference Documentation, Copyright 2008, ver. 2.0.0, 2008, 202 pages.
Oracle Database Data Cartridge Developer's Guide, B28425-03, 11 g Release 1 (11.1), Oracle, Mar. 2008, 372 pages.
Oracle Application Server, Administrator's Guide, 10g Release 3 (10.1.3.2.0), B32196-01, Oracle, Jan. 2007, 376 pages.
Oracle Application Server 10g, Release 2 and 3, New Features Overview, An Oracle White Paper, Oracle., Oct. 2005, 48 pages.
Oracle Database, SQL Reference, 10g Release 1 (10.1), Part No. B10759-01, Dec. 2003, pp. 7-1 to 7-17; 7-287 to 7-290; 14-61 to 14-74.
Business Process Management (BPM), Datasheet [online]. IBM, [retrieved on Jan. 28, 2013]. Retrieved from the Internet: <URL: http://www-142.ibm.com/software/products/us/en/category/BPM-SOFTWARE>.
Complex Event Processing in the Real World, an Oracle White Paper., Sep. 2007, 13 pages.
Coral8 Complex Event Processing Technology Overview, Coral8, Inc., Make it Continuous, Copyright 2007 Coral8, Inc., 2007, pp. 1-8.
Creating WebLogic Domains Using the Configuration Wizard, BEA Products, Version 10.0, Dec. 2007, 78 pages.
Creating Weblogic Event Server Applications, BEA WebLogic Event Server, Version 2.0, Jul. 2007, 90 pages.
Dependency Injection, Wikipedia, printed on Apr. 29, 2011, at URL: D http:en.wikipedia.org/w/index. php?title=DependencLinjection& 0ldid=260831402,, Dec. 30, 2008, pp. 1-7.
Deploying Applications to WebLogic Server, BEA WebLogic Server, ver. D 10.0, Mar. 30, 2007, 164 pages.
Developing Applications with Weblogic Server, BEA WebLogic Server, ver. D 10.0, Mar. 30, 2007, 254 pages.
EPL Reference, BEA WebLogic Event Server, ver. 2.0, Jul. 2007, 82 pages.
Esper Reference Documentation Version 3.1.0, EsperTech, retrieved from internet at URL: http://esper.codehaus.org/esper-3.1.0/doc/reference/en/pdf/esper_reference.pdf, 2009, 293 pages.
Fast Track Deployment and Administrator Guide for BEA WebLogic Server, BEA WebLogic Server 10.0 Documentation, printed on May 10, 2010, at URL:http://download.oracle.com/docs/cd/E13222_01 /wls/docs1OO/quickstart/quick_start. html, May 10, 2010, 1page.
Getting Started with WebLogic Event Server, BEA WebLogic Event Serverver 2.0, Jul. 2007, 66 pages.
High Availability Guide, Oracle Application Server, 10g Release 3 (10.1.3.2.0), B32201-01, Jan. 2007, 314 pages.
Installing Weblogic Real Time, BEA WebLogic Real Time, Ver. 2.0, Jul. 2007, 64 pages.
Introduction to BEA WebLogic Server and BEA WebLogic Express, BEA WebLogic Server, Ver. 10.0, Mar. 2007, 34 pages.
Introduction to WebLogic Real Time, BEA WebLogic Real Time, , ver. 2.0 Jul. 2007, 20 pages.
Jboss Enterprise Application Platform 4.3 Getting Started Guide CP03, for Use with Jboss Enterprise Application Platform 4.3 Cumulative Patch 3, Jboss a division of Red Hat, Red Hat Documentation Group, Copyright 2008, Red Hat, Inc., Sep. 2007, 68 pages.
Managing Server Startup and Shutdown, BEA WebLogic Server, ver. 10.0, Mar. 30, 2007, 134 pages.
Matching Behavior, .NET Framework Developer's Guide, Microsoft Corporation, Retrieved on: Jul. 1, 2008, URL: http://msdn.microsoft.com/en-us/library/Oyzc2ybO(pri nter).aspx, 2008, pp. 1-2.
New Project Proposal for Row Pattern Recognition—Amendment to SQL with Application to Streaming Data Queries, H2-2008-027, H2 Teleconference Meeting, Jan. 9, 2008, pp. 1-6.
Oracle CEP Getting Started, Release 11 gR1 (11.1.1) E14476-01, May 2009, 172 pages.
Oracle Complex Event Processing CQL Language Reference, 11g Release 1 (11.1.1) E12048-01, Apr. 2010, 540 pages.
OSGI Service Platform Core Specification, The OSGI Alliance, OSGI Alliance, ver. 4.1, release 4, Apr. 2007, 288 pages.
Release Notes, BEA WebLogic Event Server, Ver. 2.0, Jul. 2007, 8 pages.
Spring Dynamic Modules for OSGi Service Platforms product documentation, SpringSource, D, Jan. 2008, 71 pages.
Stream Base New and Noteworthy, Stream Base, Jan. 1, 2010, 878 pages.
Stream Query Repository: Online Auctions (CQL Queries)., Retrieved from: URL: http://www-db.stanford.edu/strem/sqr/cql/onauc.html, Dec. 2, 2002, 4 pages.
Stream: The Stanford Stream Data Manager, IEEE Data Engineering Bulletin., Mar. 2003, pp. 1-8.
Stream: The Stanford Stream Data Manager, Retrieved from: URL: http://infolab.stanford.edu/stream/, Jan. 5, 2006, pp. 1-9.
Understanding Domain Configuration, BEA WebLogic Server, Ver. 10.0, Mar. 30, 2007, 38 pages.
WebLogic Event Server Administration and Configuration Guide, BEA WebLogic Event D Server, Version. 2.0, Jul. 2007, 108 pages.
WebLogic Event Server Reference, BEA WebLogic Event Server, Version. 2.0, Jul. 2007, 52 pages.
Weblogic Server Performance and Tuning, BEA WebLogic Server, Ver. 10.0, Mar. 30, 2007, 180 pages.
WebSphere Application Server V6.1 Problem Determination: IBM Redpaper Collection, WebSphere Software, IBM/Redbooks, ,., Dec. 2007, 634 pages.
What is BPM?, Datasheet [online]. IBM, [retrieved on Jan. 28, 2013]. Retrieved from the Internet: <URL: http://www-01.ibm.com/software/info/bpm/whatis-bpm/>.
U.S. Appl. No. 10/948,523, Final Office Action mailed on Jul. 6, 2007, 37 pages.
U.S. Appl. No. 10/948,523, Non-Final Office Action mailed on Dec. 11, 2007, 47 pages.
U.S. Appl. No. 10/948,523, Notice of Allowance mailed on Dec. 1, 2010, 17 pages.
U.S. Appl. No. 10/948,523, Notice of Allowance mailed on Jul. 8, 2008, 30 pages.

(56) References Cited

OTHER PUBLICATIONS

U.S. Appl. No. 10/948,523, Office Action mailed on Jan. 22, 2007, 31 pages.
U.S. Appl. No. 10/948,523, Supplemental Notice of Allowance mailed on Jul. 17, 2008, 17 pages.
U.S. Appl. No. 10/948,523, Supplemental Notice of Allowance mailed on Aug. 25, 2008, 3 pages.
U.S. Appl. No. 11/601,415, Final Office Action mailed on May 27, 2009, 26 pages.
U.S. Appl. No. 11/601,415, Final Office Action mailed on Jul. 2, 2012.
U.S. Appl. No. 11/601,415, Final Office Action mailed on Jun. 30, 2010, 45 pages.
U.S. Appl. No. 11/601,415, Non-Final Office Action mailed on Sep. 17, 2008, 10 pages.
U.S. Appl. No. 11/601,415, Non-Final Office Action mailed on Nov. 30, 2009, 32 pages.
U.S. Appl. No. 11/601,415, Office Action mailed on Dec. 9, 2011.
U.S. Appl. No. 11/873,407, Final Office Action mailed on Apr. 26, 2010, 11 pages.
U.S. Appl. No. 11/873,407, Non-Final Office Action mailed on Nov. 13, 2009, 7 pages.
U.S. Appl. No. 11/873,407, Notice of Allowance mailed on Nov. 10, 2010, 14 pages.
U.S. Appl. No. 11/873,407, Notice of Allowance mailed on Mar. 7, 2011, 8 pages.
U.S. Appl. No. 11/874,197, Final Office Action mailed on Aug. 12, 2011, 26 pages.
U.S. Appl. No. 11/874,197, Final Office Action mailed on Jun. 29, 2010, 17 pages.
U.S. Appl. No. 11/874,197, Non-Final Office Action mailed on Dec. 22, 2010, 22 pages.
U.S. Appl. No. 11/874,197, Office Action mailed on Nov. 10, 2009, 14 pages.
U.S. Appl. No. 11/874,202, Final Office Action mailed on Jun. 8, 2010, 200 pages.
U.S. Appl. No. 11/874,202, Non-Final Office Action mailed on Dec. 3, 2009, 20 pages.
U.S. Appl. No. 11/874,202, Notice of Allowance mailed on Mar. 31, 2011, 12 pages.
U.S. Appl. No. 11/874,202, Notice of Allowance mailed on Dec. 22, 2010, 29 pages.
U.S. Appl. No. 11/874,850, Notice of Allowance mailed on Jan. 27, 2010, 11 pages.
U.S. Appl. No. 11/874,850, Notice of Allowance mailed on Nov. 24, 2009, 17 pages.
U.S. Appl. No. 11/874,850, Notice of Allowance mailed on Dec. 11, 2009, 5 pages.
U.S. Appl. No. 11/874,896, Final Office Action mailed on Jul. 23, 2010, 28 pages.
U.S. Appl. No. 11/874,896, Non-Final Office Action mailed on Dec. 8, 2009, 19 pages.
U.S. Appl. No. 11/874,896, Non-Final Office Action mailed on Nov. 22, 2010, 25 pages.
U.S. Appl. No. 11/874,896, Notice of Allowance mailed on Jun. 23, 2011, 30 pages.
U.S. Appl. No. 11/927,681, Non-Final Office Action mailed on Mar. 24, 2011, 17 pages.
U.S. Appl. No. 11/927,681, Notice of Allowance mailed on Jul. 1, 2011, 8 pages.
U.S. Appl. No. 11/927,683, Final Office Action mailed on Sep. 1, 2011, 18 pages.
U.S. Appl. No. 11/927,683, Non-Final Office Action mailed on Mar. 24, 2011, 13 pages.
U.S. Appl. No. 11/927,683, Notice of Allowance mailed on Nov. 9, 2011, 10 pages.
U.S. Appl. No. 11/977,437, Final Office Action mailed on Apr. 8, 2010, 18 pages.
U.S. Appl. No. 11/977,437, Non-Final Office Action mailed on Oct. 13, 2009, 9 pages.
U.S. Appl. No. 11/977,437, Notice of Allowance mailed on Mar. 4, 2013, 9 pages.
U.S. Appl. No. 11/977,437, Office Action mailed on Aug. 3, 2012.
U.S. Appl. No. 11/977,439, Non-Final Office Action mailed on Apr. 13, 2010, 7 pages.
U.S. Appl. No. 11/977,439, Notice of Allowance mailed on Mar. 16, 2011, 10 pages.
U.S. Appl. No. 11/977,439, Notice of Allowance mailed on Aug. 18, 2010, 11 pages.
U.S. Appl. No. 11/977,439, , "Notice of Allowance", Sep. 28, 2010, 6 pages.
U.S. Appl. No. 11/977,439, Notice of Allowance mailed on Nov. 24, 2010, 8 pages.
U.S. Appl. No. 11/977,440, Notice of Allowance mailed on Oct. 7, 2009, 6 pages.
U.S. Appl. No. 12/193,377, Final Office Action mailed on Jan. 17, 2013, 24 pages.
U.S. Appl. No. 12/395,871, Non-Final Office Action mailed on May 27, 2011, 7 pages.
U.S. Appl. No. 12/395,871, Notice of Allowance mailed on May 4, 2012, 27 pages.
U.S. Appl. No. 12/395,871, Office Action mailed on Oct. 19, 2011, 33 pages.
U.S. Appl. No. 12/396,008, Non-Final Office Action mailed on Jun. 8, 2011, 10 pages.
U.S. Appl. No. 12/396,008, Notice of Allowance mailed on Nov. 16, 2011, 5 pages.
U.S. Appl. No. 12/396,464, Final Office Action mailed on Jan. 16, 2013, 17 pages.
U.S. Appl. No. 12/396,464, Non-Final Office Action mailed on Sep. 7, 2012, 18 pages.
U.S. Appl. No. 12/506,891, Notice of Allowance mailed on Jul. 25, 2012, 8 pages.
U.S. Appl. No. 12/506,891, Office Action mailed on Dec. 14, 2011, 41 pages.
U.S. Appl. No. 12/506,905, Advisory Action mailed on Nov. 6, 2012, 6 pages.
U.S. Appl. No. 12/506,905, Notice of Allowance mailed on Dec. 14, 2012, 15 pages.
U.S. Appl. No. 12/506,905, Office Action mailed on Aug. 9, 2012, 42 pages.
U.S. Appl. No. 12/506,905, Office Action mailed on Mar. 26, 2012, 86 pages.
U.S. Appl. No. 12/534,384, Notice of Allowance mailed on May 7, 2013, 12 pages.
U.S. Appl. No. 12/534,384, Office Action mailed on Feb. 28, 2012, 38 pages.
U.S. Appl. No. 12/534,384, Office Action mailed on Feb. 12, 2013, 14 pages.
U.S. Appl. No. 12/534,398, Final Office Action mailed on Jun. 6, 2012, 27 pages.
U.S. Appl. No. 12/534,398, Notice of Allowance mailed on Nov. 27, 2012, 10 pages.
U.S. Appl. No. 12/534,398, Office Action mailed on Nov. 1, 2011, 32 pages.
U.S. Appl. No. 12/548,187, Non Final Office Action mailed on Sep. 27, 2011, 19 pages.
U.S. Appl. No. 12/548,187, Non-Final Office Action mailed on Apr. 9, 2013, 17 pages.
U.S. Appl. No. 12/548,187, Office Action mailed on Jun. 20, 2012, 31 pages.
U.S. Appl. No. 12/548,209, Notice of Allowance mailed on Oct. 24, 2012, 22 pages.
U.S. Appl. No. 12/548,209, Office Action mailed on Apr. 16, 2012, 40 pages.
U.S. Appl. No. 12/548,222, Non-Final Office Action mailed on Apr. 10, 2013, 16 pages.
U.S. Appl. No. 12/548,222, Non-Final Office Action mailed on Oct. 19, 2011, 19 pages.
U.S. Appl. No. 12/548,222, Office Action mailed on Jun. 20, 2012, 29 pages.
U.S. Appl. No. 12/548,281, Non-Final Office Action mailed on Apr. 12, 2013, 16 pages.

(56) References Cited

OTHER PUBLICATIONS

U.S. Appl. No. 12/548,281, Non-Final Office Action mailed on Oct. 3, 2011, 20 pages.
U.S. Appl. No. 12/548,281, Office Action mailed on Jun. 20, 2012, 29 pages.
U.S. Appl. No. 12/548,290, Final Office Action mailed on Jul. 30, 2012, 34 pages.
U.S. Appl. No. 12/548,290, Non-Final Office Action mailed on Oct. 3, 2011, 17 pages.
U.S. Appl. No. 12/548,290, Non-Final Office Action mailed on Apr. 15, 2013, 17 pages.
U.S. Appl. No. 12/874,197, Notice of Allowance mailed on Jun. 22, 2012.
U.S. Appl. No. 12/913,636, Final Office Action mailed on Jan. 8, 2013, 21 pages.
U.S. Appl. No. 12/913,636, Office Action mailed on Jun. 7, 2012.
U.S. Appl. No. 12/949,081, filed Nov. 18, 2010.
U.S. Appl. No. 12/949,081, Non-Final Office Action mailed on Jan. 9, 2013, 12 pages.
U.S. Appl. No. 12/957,194, filed Nov. 30, 2010.
U.S. Appl. No. 12/957,194, Non-Final Office Action mailed on Dec. 7, 2012, 11 pages.
U.S. Appl. No. 12/957,194, Notice of Allowance mailed on Mar. 20, 2013, 9 pages.
U.S. Appl. No. 12/957,201, filed Nov. 30, 2010.
U.S. Appl. No. 12/957,201, Final Office Action mailed on Apr. 25, 2013, 11 pages.
U.S. Appl. No. 12/957,201, Office Action mailed on Dec. 19, 2012, 15 pages.
U.S. Appl. No. 13/089,556, Non-Final Office Action mailed on Apr. 10, 2013, 10 pages.
U.S. Appl. No. 13/089,556, Office Action mailed on Nov. 6, 2012, 13 pages.
U.S. Appl. No. 13/089,556, filed Apr. 19, 2011.
U.S. Appl. No. 13/102,665, Office Action mailed on Feb. 1, 2013, 14 pages.
U.S. Appl. No. 13/107,742, Non-Final Office Action mailed on Feb. 14, 2013, 16 pages.
U.S. Appl. No. 13/184,528, Notice of Allowance mailed on Mar. 1, 2012.
U.S. Appl. No. 13/193,377, Office Action mailed on Jan. 17, 2013, 25 pages.
U.S. Appl. No. 13/193,377, Office Action mailed on Aug. 23, 2012, 48 pages.
U.S. Appl. No. 13/244,272, Final Office Action mailed on Mar. 28, 2013, 29 pages.
U.S. Appl. No. 13/244,272, Office Action mailed on Oct. 4, 2012.
U.S. Appl. No. 13/396,464, Office Action mailed on Sep. 7, 2012.
Abadi, et al., Aurora: A Data Stream Management System, International Conference on Management of Data, Proceedings of the 2003 ACM SIGMOD International Conference on Management of Data, 2003, 4 pages.
Aho, et al., Efficient String Matching: An Aid to Bibliographic Search, Communications of the ACM, vol. 18, No. 6, Association for Computing Machinery, Inc., Jun. 1975, pp. 333-340.
Arasu, et al., An Abstract Semantics and Concrete Language for Continuous Queries over Streams and Relations, 9th International Workshop on Database programming languages, Sep. 2003, 11 pages.
Arasu, et al., An Abstract Semantics and Concrete Language for Continuous Queries over Streams and Relations, 9th International Workshop on Database programming languages, Sep. 2003, 12 pages.
Arasu, et al., CQL: A language for Continuous Queries over Streams and Relations, Lecture Notes in Computer Science vol. 2921, 2004, pp. 1-19.
Arasu, et al., STREAM: The Stanford Data Stream Management System, Department of Computer Science, Stanford University, 2004, p. 21.
Arasu, et al., The CQL Continuous Query Language: Semantic Foundations and Query Execution, Stanford University, The VLDB Journal—The International Journal on Very Large Data Bases, vol. 15, No. 2, Springer-Verlag New York, Inc., Jun. 2006, pp. 1-32.
Avnur, et al., Eddies: Continuously Adaptive Query Processing, In Proceedings of the 2000 ACM SIGMOD International Conference on Data, Dallas TX, May 2000, 12 pages.
Avnur, et al., Eddies: Continuously Adaptive Query Processing, slide show, believed to be prior to Oct. 17, 2007, 4 pages.
Babu, et al., Continuous Queries over Data Streams, SIGMOD Record, vol. 30, No. 3, Sep. 2001, pp. 109-120.
Bai, et al., A Data Stream Language and System Designed for Power and Extensibility, Conference on Information and Knowledge Management, Proceedings of the 15th ACM D International Conference on Information and Knowledge Management, Arlington, Virginia, Copyright 2006, ACM Press., Conference on Information and Knowledge Management, Proceedings of the 15th ACM D International Conference on Information and Knowledge Management, Arlington, Virginia, Copyright 2006, ACM Press., Nov. 5-11, 2006, 10 pages.
Bose, et al., A Query Algebra for Fragmented XML Stream Data, 9th International Conference on Data Base Programming Languages (DBPL), Sep. 2003, 11 pages.
Buza, Extension of CQL over Dynamic Databases, Journal of Universal Computer Science, vol. 12, No. 9, Sep. 28, 2006, pp. 1165-1176.
Carpenter, User Defined Functions, Retrieved from: URL: http://www.sqlteam.comitemprint.asp?ItemID=979, Oct. 12, 2000, 4 pages.
Chan, et al., Efficient Filtering of XML documents with Xpath expressions, VLDB Journal D, 2002, pp. 354-379.
Chan Drasekaran, et al., TelegraphCQ: Continuous Dataflow Processing for an Uncertain World, Proceedings of CIDR, 2003, 12 pages.
Chen, et al., NiagaraCQ: A Scalable Continuous Query System for Internet Databases, Proceedings of the 2000 SIGMOD International Conference on Management of Data., May 2000, pp. 379-390.
Colyer, et al., Spring Dynamic Modules Reference Guide, Copyright, ver. 1.0.3, 2006-2008, 73 pages.
Colyer, et al., Spring Dynamic Modules Reference Guide, Ver. 1.1.3, 2006-2008, 96 pages.
Conway, An Introduction to Data Stream Query Processing, Truviso, Inc., URL: http://neilconway.org/talks/streamjntro.pdf, May 24, 2007, 71 pages.
Demers, et al., Towards Expressive Publish/Subscribe Systems, Proceedings of the 10th International Conference on Extending Database Technology (EDBT 2006),Munich, Germany, Mar. 2006, pp. 1-18.
Demichiel, et al., JSR 220: Enterprise JavaBeans™, EJB 3.0 Simplified API, EJB 3.0 Expert Group, Sun Microsystems, Ver. 3.0, May 2, 2006, 59 pages.
Deshpande, et al., Adaptive Query Processing, Slide show believed to be prior to Oct. 17, 2007, 27 pages.
Diao, et al., Query Processing for High-Volume XML Message Brokering, Proceedings of the 29th VLDB Conference, Berlin, Germany, 2003, 12 pages.
Diao, Query Processing for Large-Scale XML Message Brokering, University of California Berkeley, 2005, 226 pages.
Dindar, et al., Event Processing Support for Cross-Reality Environments, Pervasive Computing, IEEE CS, Jul.-Sep. 2009, Copyright 2009, IEEE, Jul.-Sep. 2009, pp. 2-9.
Fernandez, et al., Build your own XQuery processor, slide show, at URL: http://www.galaxquery.org/slides/edbt-summer-school2004.pdf, 2004, 116 pages.
Fernandez, et al., Implementing XQuery 1.0: The Galax Experience, Proceedings of the 29th VLDB Conference, Berlin, Germany, 2003, 4 pages.
Florescu, et al., The BEA/XQRL Streaming XQuery Processor, Proceedings of the 29th VLDB Conference, 2003, 12 pages.
Gilani, Design and implementation of stream operators, query instantiator and stream buffer manager, Dec. 2003, 137 pages.
Golab, et al., Issues in Data Stream Management, ACM SIGMOD Record, vol. 32, issue 2, ACM Press, Jun. 2003, pp. 5-14.

(56) References Cited

OTHER PUBLICATIONS

Golab, et al., Sliding Window Query Processing Over Data Streams, University of Waterloo, D Waterloo, Ont. Canada, Aug. 2006, 182 pages.
Gosling, et al., The Java Language Specification, Book, copyright, 3rd edition, FG, Sun Microsystems USA. D (due to size, reference will be uploaded in two parts), 1996-2005, 684 pages.
Hao, et al., Achieving high performance web applications by service and database replications at edge servers, Performance Computing and communications conference(IPCCC) IEEE 28th International, IEEE, Piscataway, NJ, USA, XP031622711, ISBN: 978-1-4244-5737-3, 2009, pp. 153-160.
Hopcroft, Introduction to Automata Theory, Languages, and Computation, Second Edition, Addison-Wesley, Copyright 2001, 524 pages.
Hulton, et al., Mining Time-Changing Data Stream, Proceedings of the Seventh ACM SIGKDD International Conference on Knowledge Discovery and Data Mining, Aug. 2001, 10 pages.
Jin, et al., ARGUS: Efficient Scalable Continuous Query Optimization for Large-Volume Data Streams, 10th International Database Engineering and Applications Symposium (IDEAS'06), 2006, 7 pages.
Kawaguchi, et al., Java Architecture for XML Binding (JAXB) 2.2, Sun Microsystems, Inc., Dec. 10, 1999, 384 pages.
Knuth, et al., Fast Pattern Matching in Strings, Siam J Comput 6(2), Jun. 1977, pp. 323-350.
Lakshmanan, et al., On efficient matching of streaming XML documents and queries, 2002, 18 pages.
Lindholm, et al., Java Virtual Machine Specification, 2nd Edition Prentice Hall, Apr. 1999, 484 pages.
Liu, et al., Efficient XSLT Processing in Relational Database System, Proceeding of the 32nd. International Conference on Very Large Data Bases (VLDB), Sep. 2006, pp. 1106-1116.
Luckham, What's the Difference Between ESP and CEP? Complex Event Processing, downloaded, at URL:http://complexevents.com/?p=103, Apr. 29, 2011, 5 pages.
Madden, et al., Continuously Adaptive Continuous Queries (CACQ) over Streams, SIGMOD, Jun. 4-6, 2002, 12 pages.
Martin, et al., Finding Application Errors and Security Flaws Using PQL, a Program Query Language, OOPSLA'05, Oct. 16, 2005, pp. 1-19.
Babcock, et al., Models and Issues in Data Streams, Proceedings of the 21st ACM SIGMOD-SIGACT-SIDART symposium on Principles of database systems, 2002, 30 pages.
Motwani, et al., Query Processing Resource Management, and Approximation in a Data 0 Stream Management System, Proceedings of CIDR, Jan. 2003, 12 pages.
Munagala, et al., Optimization of Continuous Queries with Shared Expensive Filters, Proceedings of the 26th ACM SIGMOD-SIGACT-SIGART symposium on Principles of database systems, Oct. 17, 2007, 14 pages.
Nah, et al., A Cluster-Based TMO-Structured Scalable Approach for Location Information Systems, Object-Oriented Real-Time Dependable Systems, 2003. Words 2003 Fall. Proceedings. Ninth IEEE International Workshop on Date of Conference: Oct. 1-3, 2003, pp. 225-233.
Novick, Creating a User Defined Aggregate with SQL Server 2005, URL: http://novicksoftware.com/Articles/sql-2005-product-user-defined-aggregate.html, 2005, 6 pages.
International Application No. PCT/US2011/052019, International Search Report and Written Opinion mailed on Nov. 17, 2011, 55 pages.
International Application No. PCT/US2012/034970, International Search Report and Written Opinion mailed on Jul. 16, 2012, 13 pages.
International Application No. PCT/US2012/036353, International Search Report and Written Opinion mailed on Sep. 12, 2012, 11 pages.
Peng, et al., Xpath Queries on Streaming Data, 2003, pp. 1-12.

Peterson, Petri Net Theory and the Modeling of Systems, Prentice Hall, 1981, 301 pages.
PostgresSQL, Manuals: PostgresSQL 8.2: Create Aggregate, believed to be prior to Apr. 21, 2007, 4 pages.
PostgresSQL, Documentation: Manuals: PostgresSQL 8.2: User-Defined Aggregates believed to be prior to Apr. 21, 2007, 4 pages.
Sadri, et al., Expressing and Optimizing Sequence Queries in Database Systems, ACM Transactions on Database Systems, vol. 29, No. 2, ACM Press, Copyright, Jun. 2004, pp. 282-318.
Sadtler, et al., WebSphere Application Server Installation Problem Determination, Copyright 2007, IBM Corp., 2007, pp. 1-48.
Sansoterra, Empower SQL with Java User-Defined Functions, ITJungle.com, Oct. 9, 2003, 9 pages.
Sharaf, et al., Efficient Scheduling of Heterogeneous Continuous Queries, VLDB, Sep. 12-15, 2006, pp. 511-522.
Stolze, et al., User-defined Aggregate Functions in DB2 Universal Database, Retrievd from: <http://www.128.ibm.com/deve10perworks/d b2/1 ibrary/tachartic1e/0309stolze/0309stolze.html>, Sep. 11, 2003, 11 pages.
Stump, et al., Proceedings, The 2006 Federated Logic Conference, IJCAR '06 Workshop, PPLV '06: Programming Languages meets Program Verification, 2006, pp. 1-113.
Terry, et al., Continuous queries over append-only database, Proceedings of ACM SIGMOD, 1992, pp. 321-330.
Ullman, et al., Introduction to JDBC, Stanford University, 2005, 7 pages.
Vajjhala, et al., The Java Architecture for XML Binding (JAXB) 2.0, Sun Microsystem, D Inc., Final Release, Apr. 19, 2006, 384 pages.
Vijayalakshmi, et al., Processing location dependent continuous queries in distributed mobile databases using mobile agents, IET-UK International Conference on Information and Communication Technology in Electrical Sciences (ICTES 2007), Dec. 22, 2007, pp. 1023-1030.
W3C, XML Path Language (Xpath), W3C Recommendation, Version. 1.0, Retrieved from: URL: http://www.w3.org/TR/xpath, Nov. 16, 1999, 37 pages.
Wang, et al., Distributed continuous range query processing on moving objects, DEXA'06 Proceedings of the 17th international conference on Database and Expert Systems Applications, 2006, pp. 655-665.
White, et al., WebLogic Event Server: A Lightweight, Modular Application Server for Event Processing, 2nd International Conference on Distributed Event-Based Systems, Rome, Italy, Copyright 2004., Jul. 2-4, 2008, 8 pages.
Widom, et al., CQL: A Language for Continuous Queries over Streams and Relations, Oct. 17, 2007, 62 pages.
Widom, et al., The Stanford Data Stream Management System, PowerPoint Presentation, Oct. 17, 2007, 110 pages.
Wu, et al., Dynamic Data Management for Location Based Services in Mobile Environments, Database Engineering and Applications Symposium, Jul. 16, 2003, pp. 172-181.
Zemke, XML Query, mailed on Mar. 14, 2004, 29 pages.
U.S. Appl. No. 12/548,281, Non-Final Office Action mailed on Feb. 13, 2014, 16 pages.
U.S. Appl. No. 13/177,748, Final Office Action mailed on Mar. 20, 2014, 23 pages.
U.S. Appl. No. 12/548,187, Non-Final Office Action mailed on Feb. 6, 2014, 54 pages.
International Search Report dated Apr. 3, 2014 for PCT/US2014/010832, 9 pages.
Agrawal et al., Efficient pattern matching over event streams, Proceedings of the 2008 ACM SIGMOD international conference on Management of data, Jun. 9-12, 2008, pp. 147-160.
Cadonna et al. "Efficient event pattern matching with match windows," Proceedings of the 18th ACM SIGKDD international conference on Knowledge discovery and data mining, pp. 471-479 (Aug. 2012).
Nichols et al. "A faster closure algorithm for pattern matching in partial-order event data," IEEE International Conference on Parallel and Distributed Systems, pp. 1-9 (Dec. 2007).
Call User Defined Functions from Pig, Amazon Elastic MapReduce, Mar. 2009, 2 pages.

(56) References Cited

OTHER PUBLICATIONS

Strings in C, retrieved from the internet: <URL: https://web.archive.org/web/20070612231205/http:l/web.cs.swarthmore.edu/-newhall/unixhelp/C_strings.html> [retrieved on May 13, 2014], Swarthmore College, Jun. 12, 2007, 3 pages.
U.S. Appl. No. 11/874,197, Notice of Allowance mailed on Jun. 22, 2012, 20 pages.
U.S. Appl. No. 13/838,259, filed Mar. 15, 2013, Deshmukh et al.
U.S. Appl. No. 13/839,288, filed Mar. 15, 2013, Deshmukh et al.
U.S. Appl. No. 12/396,464, Final Office Action mailed on May 16, 2014, 16 pages.
U.S. Appl. No. 12/548,187, Final Office Action mailed on Jun. 4, 2014, 64 pages.
U.S. Appl. No. 13/089,556, Final Office Action mailed on Jun. 13, 2014, 14 pages.
U.S. Appl. No. 13/107,742, Non-Final Office Action mailed on Jun. 19, 2014, 20 pages.
U.S. Appl. No. 13/244,272, Notice of Allowance mailed on Aug. 12, 2013, 12 pages.
International Application No. PCT/US2011/052019, International Preliminary Report on Patentability mailed on Mar. 28, 2013, 6 pages.
International Application No. PCT/US2012/034970, International Preliminary Report on Patentability mailed on Nov. 21, 2013, 7 pages.
International Application No. PCT/US2012/036353, International Preliminary Report on Patentability mailed on Nov. 28, 2013, 6 pages.
SQL Tutorial-In, Tizag.com, http://web.archive.org/web/20090216215219/http://www.tizag.com/sqiTutorial/sqlin.php, Feb. 16, 2009, pp. 1-3.
U.S. Appl. No. 12/548,187, Final Office Action, mailed Jun. 10, 2013, 18 pages.
U.S. Appl. No. 12/548,222, Notice of Allowance, mailed Jul. 18, 2013, 12 pages.
U.S. Appl. No. 13/102,665, Final Office Action, mailed Jul. 9, 2013, 17 pages.
U.S. Appl. No. 13/107,742, Final Office Action, mailed Jul. 3, 2013, 19 pages.
Notice of Allowance for U.S. Appl. No. 11/977,437 dated Jul. 10, 2013, 10 pages.
U.S. Appl. No. 12/949,081, Non-Final Office Action mailed on Jan. 28, 2015, 20 pages.
U.S. Appl. No. 12/957,201, Notice of Allowance mailed on Jan. 21, 2015, 5 pages.
U.S. Appl. No. 13/107,742, Final Office Action mailed on Jan. 21, 2015, 23 pages.
U.S. Appl. No. 13/177,748, Non-Final Office Action mailed on Feb. 3, 2015, 22 pages.
U.S. Appl. No. 13/770,961, Non-Final Office Action mailed on Feb. 4, 2015, 22 pages.
U.S. Appl. No. 13/770,969, Notice of Allowance mailed on Jan. 22, 2015, 5 pages.
U.S. Appl. No. 13/829,958, Non-Final Office Action mailed on Dec. 11, 2014, 15 pages.
U.S. Appl. No. 13/906,162, Non-Final Office Action mailed on Dec. 29, 2014, 10 pages.
International Application No. PCT/US2014/010832, Written Opinion mailed on Dec. 15, 2014, 5 pages.
International Application No. PCT/US2014/010920, International Search Report and Written Opinion mailed on Dec. 15, 2014, 10 pages.
International Application No. PCT/US2014/017061, Written Opinion mailed on Feb. 3, 2015, 6 pages.
International Application No. PCT/US2014/039771, International Search Report and Written Opinion mailed on Sep. 24, 2014, 12 pages.
Notice of Allowance for U.S. Appl. No. 13/089,556 dated Oct. 6, 2014, 9 pages.
U.S. Appl. No. 12/396,464, Notice of Allowance mailed on Sep. 3, 2014, 7 pages.
U.S. Appl. No. 12/548,187, Advisory Action mailed on Sep. 26, 2014, 6 pages.
U.S. Appl. No. 12/548,281, Final Office Action mailed on Aug. 13, 2014, 19 pages.
U.S. Appl. No. 12/913,636, Non-Final Office Action mailed on Jul. 24, 2014, 22 pages.
U.S. Appl. No. 12/957,201, Non-Final Office Action mailed on Jul. 30, 2014, 12 pages.
U.S. Appl. No. 13/770,969, Non-Final Office Action mailed on Aug. 7, 2014, 9 pages.
U.S. Appl. No. 14/302,031, Non-Final Office Action mailed on Aug. 27, 2014, 19 pages.
Abadi et al., Aurora: a new model and architecture for data stream management, The VLDB Journal the International Journal on Very Large Data Bases, vol. 12, No. 2, Aug. 1, 2003, pp. 120-139.
Balkesen et al., Scalable Data Partitioning Techniques for Parallel Sliding Window Processing over Data Streams, 8th International Workshop on Data Management for Sensor Networks, Aug. 29, 2011, pp. 1-6.
Chandrasekaran et al., PSoup: a system for streaming queries over streaming data, The VLDB Journal the International Journal on Very Large Data Bases, vol. 12, No. 2, Aug. 1, 2003, pp. 140-156.
Krämer, Continuous Queries Over Data Streams—Semantics and Implementation, Fachbereich Mathematik and Informatik der Philipps-Universitat, Marburg, Germany, Retrieved from the Internet: URL:http://archiv.ub.uni-marburg.de/dissjz007/0671/pdfjdjk.pdf, Jan. 1, 2007; 313 pages.
International Application No. PCT/US2013/062047, International Search Report and Written Opinion mailed on Jul. 16, 2014, 12 pages.
International Application No. PCT/US2013/062050, International Search Report & Written Opinion mailed on Jul. 2, 2014, 13 pages.
International Application No. PCT/US2013/062052, International Search Report & Written Opinion mailed on Jul. 3, 2014, 12 pages.
International Application No. PCT/US2013/073086, International Search Report and Written Opinion mailed on Mar. 14, 2014.
International Application No. PCT/US2014/017061, International Search Report mailed on Sep. 9, 2014, 4 pages.
Ray et al., Optimizing complex sequence pattern extraction using caching, data engineering workshops (ICDEW) 2011 IEEE 27th international conference on IEEE, Apr. 11, 2011, pp. 243-248.
Shah et al., Flux: an adaptive partitioning operator for continuous query systems, Proceedings of the 19th International Conference on Data Engineering, Mar. 5-8, 2003, pp. 25-36.
Babu et al., "Exploiting k-Constraints to Reduce Memory Overhead in Continuous Queries Over Data Streams", ACM Transactions on Database Systems (TODS) vol. 29 Issue 3, Sep. 2004, 36 pages.
Tho et al. "Zero-latency data warehousing for heterogeneous data sources and continuous data streams," 5th International Conference on Information Integrationand Web-based Applications Services (Sep. 2003) 12 pages.
"SQL Subqueries"—Dec. 3, 2011, 2 pages.
"Caching Data with SqiDataSource Control"—Jul. 4, 2011, 3 pages.
"SCD—Slowing Changing Dimensions in a Data Warehouse"—Aug. 7, 2011, one page.
Non-Final Office Action for U.S. Appl. No. 13/838,259 dated Oct. 24, 2014, 21 pages.
Notice of Allowance for U.S. Appl. No. 13/102,665 dated Nov. 24, 2014, 9 pages.
Non-Final Office Action for U.S. Appl. No. 13/827,631 dated Nov. 13, 2014, 10 pages.
Non-Final Office Action for U.S. Appl. No. 13/827,987 dated Nov. 6, 2014, 9 pages.
Non-Final Office Action for U.S. Appl. No. 11/601,415 dated Oct. 6, 2014, 18 pages.
Non-Final Office Action for U.S. Appl. No. 14/077,230 dated Dec. 4, 2014, 30 pages.
Non-Final Office Action for U.S. Appl. No. 13/828,640 dated Dec. 2, 2014, 11 pages.
Non-Final Office Action for U.S. Appl. No. 13/830,428 dated Dec. 5, 2014, 23 pages.

(56) References Cited

OTHER PUBLICATIONS

Non-Final Office Action for U.S. Appl. No. 13/830,502 dated Nov. 20, 2014, 25 pages.
Non-Final Office Action for U.S. Appl. No. 13/839,288 dated Dec. 4, 2014, 30 pages.
Notice of Allowance for U.S. Appl. No. 12/548,187 dated Aug. 17, 2015, 18 pages.
Notice of Allowance for U.S. Appl. No. 13/107,742 dated Jul. 8, 2015, 9 pages.
Non-Final Office Actio for U.S. Appl. No. 14/037,072 dated Jul. 9, 2015, 12 pages.
Final Office Action for U.S. Appl. No. 13/830,502 dated Jun. 30, 2015, 25 pages.
Non-Final Office Action for U.S. Appl. No. 14/036,659 dated Aug. 13, 2015, 33 pages.
Non-Final Office Action for U.S. Appl. No. 13/830,759 dated Aug. 7, 2015, 23 pages.
International Preliminary Report on Patentability dated Jul. 29, 2015 for PCT/US2014/010920, 30 pages.
International Preliminary Report on Patentability dated Jul. 29, 2015 for PCT/US2014/039771, 24 pages.
International Application No. PCT/US2014/039771, International Search Report and Written Opinion mailed on Apr. 29, 2015 6 pages.
International Application No. PCT/US2015/016346, International Search Report and Written Opinion mailed on May 4, 2015, 9 pages.
International Preliminary Report on Patentability dated Apr. 9, 2015 for PCT/US2013/062047, 10 pages.
International Preliminary Report on Patentability dated Apr. 9, 2015 for PCT/US2013/062052, 18 pages.
International Preliminary Report on Patentability dated May 28, 2015 for PCT/US2014/017061, 31 pages.
International Preliminary Report on Patentability dated Jun. 18, 2015 for PCT/US2013/073086, 7 pages.
Final Office Action for U.S. Appl. No. 14/302,031 dated Apr. 22, 2015, 23 pages.
Non-Final Office Action for U.S. Appl. No. 14/692,674 dated Jun. 5, 2015, 22 pages.
Non-Final Office Action for U.S. Appl. No. 14/037,171 dated Jun. 3, 2015, 15 pages.
Non-Final Office Action for U.S. Appl. No. 14/830,735 dated May 26, 2015, 19 pages.
Final Office Action for U.S. Appl. No. 13/830,428 dated Jun. 4, 2015, 21 pages.
Non-Final Office Action for U.S. Appl. No. 14/838,259 dated Jun. 9, 2015, 37 pages.
Final Office Action for U.S. Appl. No. 14/906,162 dated Jun. 10, 2015, 10 pages.
Non-Final Office Action for U.S. Appl. No. 14/037,153 dated Jun. 19, 2015, 23 pages.
Final Office Action for U.S. Appl. No. 13/829,958 dated Jun. 19, 2015, 17 pages.
Final Office Action for U.S. Appl. No. 13/827,987 dated Jun. 19, 2015, 10 pages.
Final Office Action for U.S. Appl. No. 13/828,640 dated Jun. 17, 2015, 11 pages.
China Patent Office office actions for patent application CN201280022008.7 (Dec. 3, 2015), 22 pages.
European Application No. 12783063.6, Office Action mailed on Nov. 11, 2015, 8 pages.
Notice of Allowance for U.S. Appl. No. 12/548,187 dated Feb. 2, 2016, 15 pages.
Notice of Allowance for U.S. Appl. No. 14/037,072 dated Feb. 16, 2016, 16 pages.
Final Office Action for U.S. Appl. No. 13/830,735 dated Dec. 21, 2015, 20 pages.
Notice of Allowance for U.S. Appl. No. 13/827,987 dated Jan. 4, 2016, 16 pages.
Notice of Allowance for U.S. Appl. No. 13/177,748 dated Jan. 6, 2016, 9 pages.
Notice of Allowance for U.S. Appl. No. 13/828,640 dated Jan. 6, 2016, 16 pages.
Non-Final Office Action for U.S. Appl. No. 13/830,428 dated Jan. 15, 2016, 25 pages.
Final Office Action for U.S. Appl. No. 14/037,153 dated Jan. 21, 2016, 31 pages.
Non-Final Office Action for U.S. Appl. No. 13/829,958 dated Feb. 1, 2016, 20 pages.
Non-Final Office Action for U.S. Appl. No. 13/827,631 dated Feb. 11, 2016, 12 pages.
Ghazal et al., Dynamic plan generation for parameterized queries, Jul. 2009, 7 pages.
Chaudhuri et al., Variance aware optimization of parameterized queries, Jun. 2010, 12 pages.
Seshadri et al., SmartCQL: Semantics to Handle Complex Queries over Data Streams, 2010, 5 pages.
International Search Report and Written Opinion dated Dec. 15, 2015 for PCT/US2015/051268, 17 Pages.
"11 Oracle Event Processing NoSQL 1-20 Database Data Cartridge—llg Release 1 (11.1.1.7) 11," Oracle Fusion Middleware CQL Language Reference for Oracle Event Processing 11g Release 1 (11.1.1.7), 4 pages. (Sep. 25, 2013).
Oracle Event Processing Hadoop Data Cartridge—11g Release 1(11.1.1.7), Oracle Fusion Middleware CQL LanguageReference for Oracle Event Processing 11g Release 1 (11.1.1.7) 4 pages. (Sep. 25, 2013).
Liu "Hbase Con 2014: HBase Design Patterns @Yahoo!" (May 5, 2014), 20 pages.
Hasan et al. "Towards unified and native enrichment in event processing systems," Proceedings of the 7th ACM international conference on Distributed event-based systems, pp. 171-182 (Jun. 29, 2013).
Katsov "In-Stream Big Data Processing : Highly Scalable Blog" 20 pages (Aug. 20, 2013).
Katsov "In-Stream Big Data Processing : Highly Scalable Blog" 19 pages (Aug. 29, 2014).
Non-Final Office Action for U.S. Appl. No. 14/079,538 dated Oct. 22, 2015, 34 pages.
Non-Final Office Action for U.S. Appl. No. 13/906,162 dated Oct. 28, 2015, 11 pages.
Notice of Allowance for U.S. Appl. No. 14/302,031 dated Nov. 3, 2015, 18 pages.
Final Office Action for U.S. Appl. No. 12/949,081 dated Nov. 17, 2015, 19 pages.
China Patent Office office actions for patent application CN201180053021.4 (Oct. 28, 2015), 17 pages.
Notice of Allowance for U.S. Appl. No. 12/913,636 dated Oct. 27, 2015, 22 pages.
Final Office Action for U.S. Appl. No. 13/830,378 dated Nov. 5, 2015, 28 pages.
Non-Final Office Action for U.S. Appl. No. 13/830,502 dated Dec. 11, 2015, 25 pages.
Non-Final Office Action for U.S. Appl. No. 11/601,415 dated Nov. 13, 2015, 18 pages.
Final Office Action for U.S. Appl. No. 13/177,748 dated Aug. 21, 2015, 24 pages.
Non-Final Office Action for U.S. Appl. No. 14/036,500 dated Aug. 14, 2015, 26 pages.
Notice of Allowance for U.S. Appl. No. 13/830,129 dated Sep. 22, 2015, 9 pages.
Final Office Action for U.S. Appl. No. 13/770,961 dated Aug. 31, 2015, 28 pages.
U.S. Appl. No. 14/077,230, Notice of Allowance mailed on Apr. 16, 2015, 16 pages.
Non-Final Office Action for U.S. Appl. No. 14/621,098 dated Oct. 15, 2015, 21 pages.
Notice of Allowance for U.S. Appl. No. 14/692,674 dated Oct. 15, 2015, 10 pages.
Notice of Allowance for U.S. Appl. No. 14/037,171 dated Oct. 15, 2015, 14 pages.
"Oracle Complex Event Processing Exalogic Performance Study" an Oracle White Paper, Sep. 2011, 16 pages.

(56) References Cited

OTHER PUBLICATIONS

Bestehorn Fault-tolerant query processing in structured P2P-systems, Springer Science+Business Media LLC Distrib Parallel Databases 28:33-66 (May 8, 2010).
Kramer "Semantics and Implementation of Continuous Sliding Window Queries over Data Streams" ACM Transactions on Database Systems, vol. 34, pp. 4:1 to 4:49 (Apr. 2009).
Final Office Action for U.S. Appl. No. 13/830,428 dated May 26, 2016, 26 pages.
Final Office Action for U.S. Appl. No. 11/601,415 dated May 17, 2016, 17 pages.
Final Office Action for U.S. Appl. No. 14/036,659 dated Apr. 22, 2016, 38 pages.
Non-Final Office Action for U.S. Appl. No. 14/883,815 dated May 10, 2016, 32 pages.
Notice of Allowance for U.S. Appl. No. 12/949,081 dated May 3, 2016, 6 pages.
Final Office Action for U.S. Appl. No. 13/829,958 dated Jun. 30, 2016, 19 pages.
Final Office Action for U.S. Appl. No. 13/830,502 dated Jul. 6, 2016, 28 pages.
Cooperativesystems: "Combined WLAN and Inertial Indoor Pedestrian Positioning System" URL:https://www.youtube.com/watch?v=mEt88WaNZvU, May 6, 2016, 2 pages.
Frank et al "Development and Evaluation of a Combined WLAN & Inertial Indoor Pedestrian Positioning System" Proceedings of the 22$^{nd}$ International Technical Meeting of the Satellite Division of the Institute of Navigation (ION GNSS 2009). (Sep. 25, 2009) pp. 538-546.
International Preliminary Report on Patentabiilty dated Jun. 16, 2016 for PCT/US2014/068641, 7 pages.
International Application No. PCT/RU2015/000468, International Search Report and Written Opinion mailed on Apr. 25, 2016, 8 pages.
International Application No. PCT/US2015/016346, International Search Report and Written Opinion mailed on May 24, 2016, 5 pages.
China Patent Office office action for patent application CN201180053021.4 (May 27, 2016), 14 pages.
Japan Patent Office office actions JPO patent application JP2014-509315 (Mar. 15, 2016). English Search Record. 5 pages total.
Yosuke Watanabe et al., Development of a Data Stream Integration System with a Multiple Query Optimizer, Journal articles of the 15th Data Engineering Workshop (DEWS2004), The Institute of Electronics, Information and Communication Engineers, Technical Committee on Data Engineering, Aug. 11, 2009, pp. 1-8.
Shuhei Kuwata et al., Stream Data Analysis Application for Customer Behavior with Complex Event Processing, IEICE Technical Report, The Institute of Electronics, Information and Communication Engineers, Jun. 21, 2010, vol. 110, No. 107, pp. 13-18.
Hiroyuki Kitagawa et al., Sensing Network, Information Processing, Information Processing Society of Japan, Sep. 15, 2010, vol. 51, No. 9, 9 pages.
Final Office Action for U.S. Appl. No. 13/830,759 dated Feb. 18, 2016, 18 pages.
Notice of Allowance for U.S. Appl. No. 13/770,961 dated Apr. 4, 2016, 8 pages.
Final Office Action for U.S. Appl. No. 13/838,259 dated Feb. 19, 2016, 47 pages.
Notice of Allowance for U.S. Appl. No. 13/906,162 dated Apr. 5, 2016, 7 pages.
Final Office Action for U.S. Appl. No. 14/036,500 dated Mar. 17, 2016, 34 pages.
Non-Final Office Action for U.S. Appl. No. 13/830,378 dated Feb. 25, 2015, 23 pages.
Non-Final Office Action for U.S. Appl. No. 13/830,129 dated Feb. 27, 2015, 19 pages.
Non-Final Office Action for U.S. Appl. No. 12/913,636 dated Apr. 1, 2015, 22 pages.
Final Office Action for U.S. Appl. No. 13/827,631 dated Apr. 3, 2015, 11 pages.
Notice of Allowance for U.S. Appl. No. 13/839,288 dated Apr. 3, 2015, 12 pages.
Cranor et al. "Gigascope: a stream database for network applications," Proceedings of the 2003 ACM SIGMOD international conference on Management of data, pp. 647-651 (Jun. 2003).
International Application No. PCT/US2014/068641, International Search Report and Written Opinion mailed on Feb. 26, 2015, 11 pages.
European Patent Application No. 12783063.6, Extended Search Report mailed Mar. 24, 2015, 6 pages.
International Application No. PCT/US2015/016346, International Preliminary Report on Patentability mailed on Sep. 30, 2016, 6 pages.
PCT Written Opinion dated Aug. 18, 2016 for PCT/US2015/051268, 7 Pages.
U.S. Appl. No. 14/079,538, Final Office Action mailed on Jul. 27, 2016, 28 pages.
U.S. Appl. No. 14/883,815, Notice of Allowance mailed on Aug. 30, 2016, 13 pages.
U.S. Appl. No. 13/827,631, Final Office Action mailed on Oct. 20, 2016, 12 pages.

\* cited by examiner

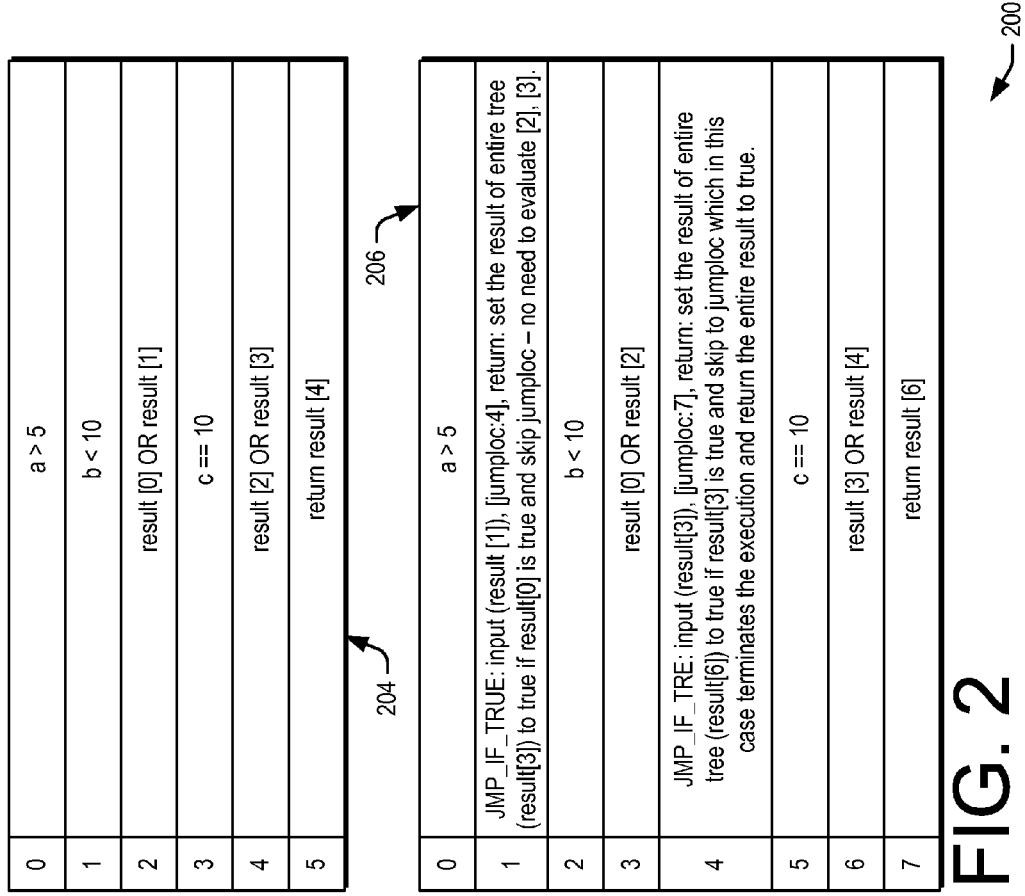
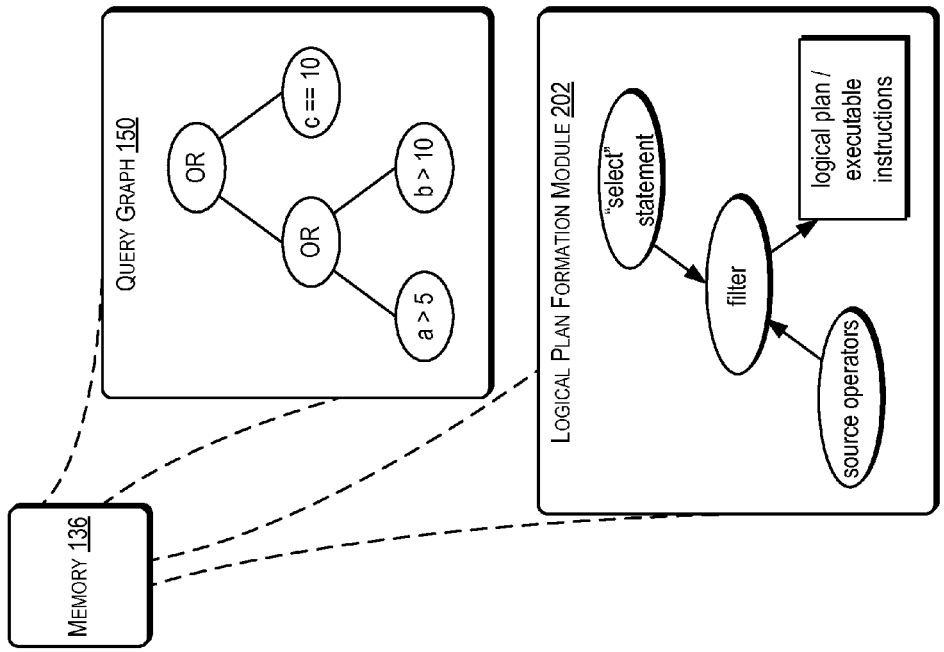
FIG. 2

FAST PATH EVALUATION OF BOOLEAN PREDICATES

CROSS REFERENCES TO RELATED APPLICATIONS

The present application is a non-provisional of and claims the benefit and priority under 35 U.S.C. 119(e) of U.S. Provisional Application No. 61/707,641 filed Sep. 28, 2012 entitled REAL-TIME BUSINESS EVENT ANALYSIS AND MONITORING, the entire contents of which are incorporated herein by reference for all purposes.

BACKGROUND

Data associated with a database or streaming data may be stored, managed, and/or processed in many different ways. Currently, there are many different types of database languages, methods, and/or functions for managing such data. Additionally, as data storage becomes increasingly less expensive over time, more and more data is being backed-up, stored, or otherwise managed. However, some databases are so populated with data that performing queries can be very time consuming and/or processor intensive. Additionally, service providers may provide data management services to users for data stored or managed on the user's behalf. Other resources of the service providers may be strained when complex queries are processed. Additionally, in some examples, executing instructions for performing a particular database query or query statement may involve an excessive number of processor cycles and/or instructions due to the complexity of the query and/or the amount of data of the database or stream. For example, some queries may include complex predicates with Boolean operators, conditions, or the like. However, managing queries with such complex predicates may pose challenges to the service providers.

BRIEF SUMMARY

Techniques for managing the fast path evaluation of Boolean predicates are provided. In some examples, a computing system may determine a first instruction for enabling execution of a subset of logical operators of a query. The first instruction may be configured to generate a query graph including nodes for operators and/or values. The determination may be made based at least in part on the logical operator of the query. Additionally, the system may generate logical instructions for implementing the query based at least in part on the determined first instruction. In some examples, the system may also compile the logical instructions into machine-readable instructions for implementing only the subset of the logical operators of the query. The subset may include less than all of the logical operators of the query. The system may also execute at least a portion of the machine-readable instructions which, in some examples, may include at least skipping execution of one or more of the machine-readable instructions. Additionally, in some cases, the system may also receive the query as a query statement including at least one predicate. The predicate may be a clause for evaluating to true or false. The clause may be a "where" clause, and the "where" clause may include at least one or more logical operators and/or Boolean predicates. The query may be configured to reference data corresponding to or otherwise associated with an event processor.

Additionally, in some examples, a computer-readable memory may be provided. The memory may store a plurality of instructions that cause one or more processors to at least determine a first instruction for enabling execution of less than all of one or more logical operators of a query statement. The determination may be based at least in part on the one or more logical operators of the query statement. Additionally, in some examples, the instructions may cause the one or more processors to at least generate logical instructions for implementing the query statement based at least in part on the first instruction. Further, the instructions may cause the one or more processors to at least compile the logical instructions into machine-readable code. Additionally, in some examples, the query statement may include at least one predicate, and the predicate may include at least one clause for evaluating to true or false. Additionally, the query statement may be configured to retrieve historical and/or streaming data. Further, the predicate may include one or more other logical operators.

Furthermore, in some examples, a method may be provided. The method may be configured to generate a query graph for enabling execution of less than all of one or more logical operators of the query statement. In some cases, the determination may be based at least in part on the one or more logical operators of the query statement. In some aspects, the method may also be configured to generate, based at least in part on the query graph, a logical plan for implementing the query statement to process the data. The method may also be configured to compile the logical plan into machine-readable instructions and/or execute at least a portion of the machine-readable instructions. In some examples, executing at least a portion of the machine-readable instructions may include at least jumping one or more of the machine-readable instructions and/or not executing all of the machine-readable instructions. Additionally, in some examples, the instructions may include a jump_if_true or a jump_if_false instruction. The logical plan may include a set of instructions to be compiled. Further, in some examples, the logical plan may include a jump_if_true statement following an "or" operator or a "jump_if_false" statement following an "and" operator.

The foregoing, together with other features and embodiments, will become more apparent upon referring to the following specification, claims, and accompanying drawings.

BRIEF DESCRIPTION OF THE DRAWINGS

The detailed description is set forth with reference to the accompanying figures. In the figures, the left-most digit(s) of a reference number identifies the FIG. in which the reference number first appears. The use of the same reference numbers in different FIGS. indicates similar or identical items.

FIG. 2 is a simplified block diagram illustrating at least some features of the fast path evaluation of Boolean predicates described herein, according to at least one example.

DETAILED DESCRIPTION

Figure 1:
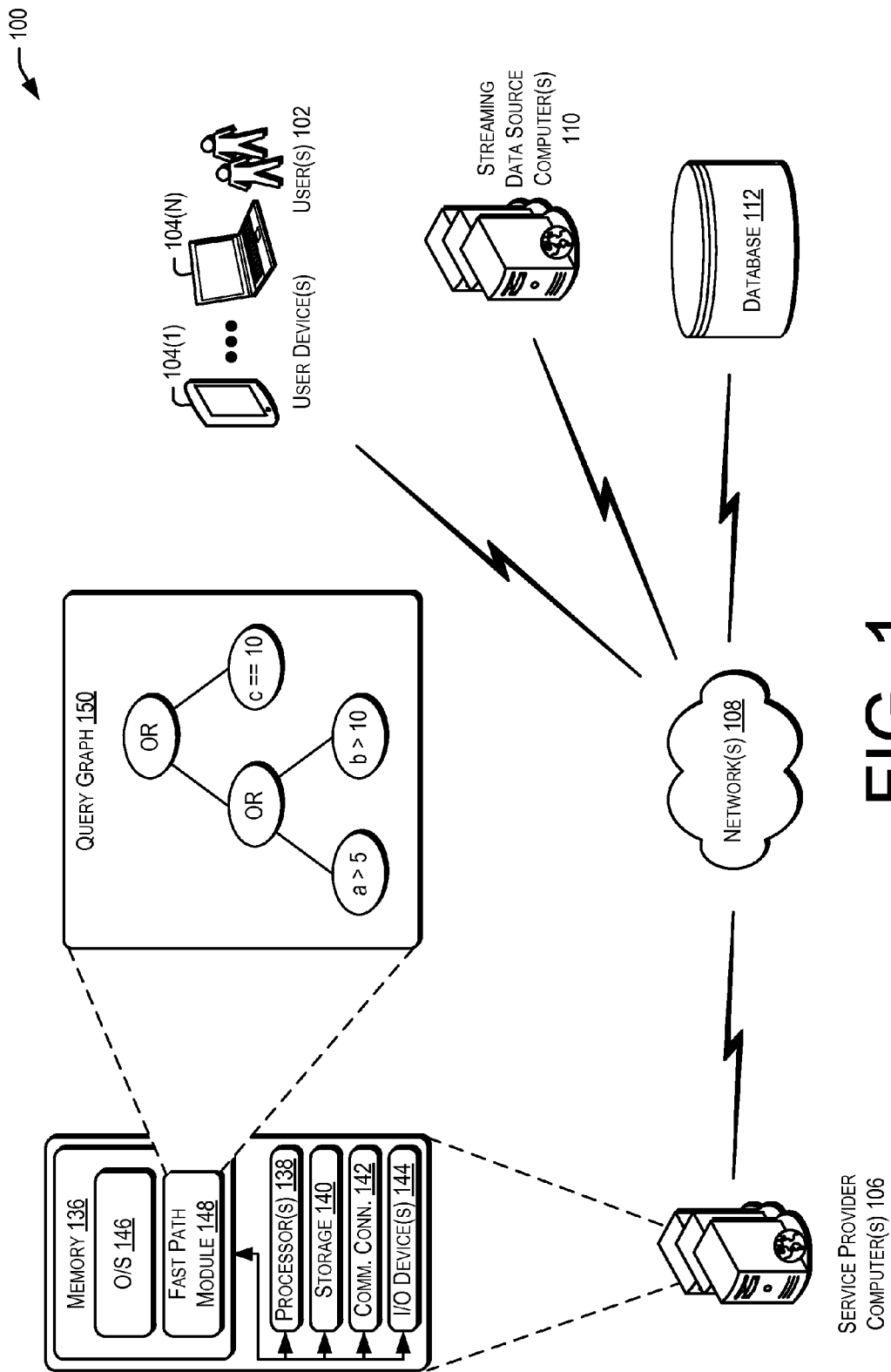
FIG. 1 is a simplified block diagram illustrating an example architecture for managing the fast path evaluation of Boolean predicates, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, managing fast path predicate evaluation (e.g., within a query language). In some examples, a query language may be defined by or may at least include one or more predicates. For example, a predicate may be a condition, a complex condition, and/or a combination of complex conditions that are to be evaluated. Examples of predicate clauses may include, but are not limited to, "greater than," "less than," or "equals," "not equals," "less than or equals," among others (e.g., >, <, =, !=, <=, respectively). As such, predicate clauses may resolve to either "true," or "false" based at least in part on inputs associated with the predicates. In some cases, the predicate may include one or more logical operators (e.g., "or," "and," "inlist," etc.). Additionally, the operands of the logical operators and/or (as noted) the predicates themselves may evaluate to "true," or "false." In other words, the operators may be Boolean operators. The query language may be configured to manage or otherwise operate with a database, a server of data, and/or streaming data (e.g., utilizing a complex event processing (CEP) engine or server and/or utilizing a messaging service or the like).

Additionally, in some aspects, managing fast path predicate evaluation may include operating one or more processors configured to receive a query. As noted, the query may include one or more predicates to be evaluated, each predicate including one or more logical operators. In some examples, a predicate may be a clause (e.g., a "where" clause) including other predicates or the predicate may be the operators to be evaluated within the "where" clause. As desired, any type of conditional cause (e.g., a "which" clause, "if" clause, etc.) may be utilized in the query. Additionally, the conditional clause (e.g., "greater than," "less than," or "equals," "not equals," "less than or equals," etc. (e.g., >, <, =, !=, <=, respectively)) may be part of a "select" operation or other query operation for retrieving (i.e., querying) data from a source. Further, in some examples, based at least in part on the predicates included in the query, a logical plan may be generated (e.g., a set of instructions for implementing the query). For example, the logical plan may include a list of instructions to be performed by the one or more processors (or other processors of different computing systems) to implement or otherwise perform the query. Again, the query may evaluate data from a database and/or streaming data from a source other than the database. Once generated, the logical plan may be compiled such that it executable (e.g., into machine readable code, processor-specific code, or the like). Once compiled, the execution of the logical plan may include skipping or otherwise jumping over instructions at runtime, thereby saving considerable clock cycles especially, in some examples, when particular conditions evaluate to true or false.

In some examples, the logical plan may be determined based at least in part on a single pass of the query, predicates, or operators. Additionally, in some cases, the query operators may first be represented in a data structure (e.g., a tree, graph, etc.). In one non-limiting example, a query tree may be generated with leaf nodes representing expressions to be evaluated and/or parent nodes representing the operators associated with the expressions to be evaluated. Further, in some examples, generating the logical plan may include traversing the tree in a single pass and in a bottom-up fashion. In some cases, the logical plan may include instructions for jumping expressions that would otherwise be evaluated. For example, for each "or" operator in the tree, a "jump if true" condition may be included after the first expression is evaluated. In this way, the other expression associated with the "or" operator may not be evaluated because its evaluation would not be needed. This is because of the fact that for the expression "A or B," if A is true, it doesn't matter whether B is true; the expression will evaluate to "true." Alternatively, the opposite is true for "and" operators. As such, for each "and" operator in the tree, a "jump if false" condition may be included after the first expression is evaluated.

Once the logical plan is compiled into machine-readable or machine-executable code, one or more processors may execute the code and effectively skip execution of some of the code when appropriate based at least in part on the "jump" conditions. Additionally, as described above, the data to be queried by the query and/or the machine-executable code generated based at least in part on the logical plan (e.g., generated based at least in part on the query) may include event-specific data from a CEP processor, engine, or server, database data (e.g., warehouse or historical data), business intelligence (BI) data, Operational Intelligence (OI) data, continuous query language (CQL) data, and/or other streaming data (e.g., real-time data). Additional details and/or description of systems and/or methods for managing fast path predicate evaluation are described below.

In some examples, the fast path or short circuit evaluation of a complex predicate may occur when the first predicate in a chain of disjunctive (OR) operators is true or the first predicate in a chain of conjunctive (AND) operators is false. In such cases it is not necessary to evaluate the remaining predicates in the chain as it does not really change the overall result (true or false). For example, in the predicate A OR B OR C it is not necessary to evaluate predicate B and C if A is "true," as the overall result of A OR B OR C would also be true. Similar reasoning applies to AND operators when the result of the first evaluation is false as in A AND B AND C.

In some scenarios, a complex predicate can be a chain of conjunctions (AND) or disjunctions (OR). For example (A OR B OR C) AND (D OR E OR F). Here, {A, B, C, D, E, F} themselves could be simple expressions or could in turn be complex expressions. The semantic of Boolean predicates is language dependent and could have potential side effects. For example, some languages (C/C++) may explicitly terminate evaluation on finding a "true" condition in a complex disjunctive condition. This means the remaining expressions in the chain may not be evaluated at all. So subsequent computation may not rely on those expressions being always evaluated at runtime.

Additionally, in the context of database systems, unlike in regular programming languages, a logical predicate can evaluate to either "true," "false," or "unknown." The last result usually ("unknown") may occur in the presence of NULL values. In some cases, this problem may be solved, in the context of database systems, at run time. A predicate may be transformed as a conjunction or a disjunction. Then at run time the predicates may be evaluated in a top down manner, beginning at the root of the tree. If it is a conjunction and the left tree is false then the evaluation of the right expression may be skipped and the whole expression may be returned as "false." Similarly, if it is a disjunction and the left tree is true then the evaluation of the entire right expression subtree may be skipped and the whole expression may be returned as "true.

However, in the context of a CQL engine, the evaluation of context may be setup at compile time and not at runtime. At the core, any expression may be translated into a series of arithmetic and Boolean instructions as in a language compiler. These instructions may then be evaluated at runtime starting with the first instruction, as desired. This translation and/or execution may be a bottom-up evaluation of an expression. In some examples, fast path predicate evaluation may be implemented by introducing at least two instruction opcodes, called JMP_IF_TRUE and JMP_IF_FALSE. These may be conditional jump instructions which jump to a particular location if the result of the previous instruction execution is found to be "true," or "false," respectively.

In one non-limiting example, these conditional instructions may take the following operands/arguments:

```
(addr, result, input operand)
    input operand = input value (result of execution of previous
    instruction)
    addr = which location in array to jump to if input operand is true
(JMP_IF_TRUE) or false (JMP_IF_FALSE)
    result = where the result of this instruction is kept.
```

The techniques described above and below may be implemented in a number of ways and in a number of contexts. Several example implementations and contexts are provided with reference to the following figures, as described below in more detail. However, the following implementations and contexts are but a few of many.

A continuous data stream (also referred to as an event stream) may include a stream of data or events that may be continuous or unbounded in nature with no explicit end. Logically, an event or data stream may be a sequence of data elements (also referred to as events), each data element having an associated timestamp. A continuous event stream may be logically represented as a bag or set of elements (s, T), where "s" represents the data portion, and "T" is in the time domain. The "s" portion is generally referred to as a tuple or event. An event stream may thus be a sequence of time-stamped tuples or events.

In some aspects, the timestamps associated with events in a stream may equate to a clock time. In other examples, however, the time associated with events in an event stream may be defined by the application domain and may not correspond to clock time but may, for example, be represented by sequence numbers instead. Accordingly, the time information associated with an event in an event stream may be represented by a number, a timestamp, or any other information that represents a notion of time. For a system receiving an input event stream, the events arrive at the system in the order of increasing timestamps. There could be more than one event with the same timestamp.

In some examples, an event in an event stream may represent an occurrence of some worldly event (e.g., when a temperature sensor changed value to a new value, when the price of a stock symbol changed) and the time information associated with the event may indicate when the worldly event represented by the data stream event occurred.

For events received via an event stream, the time information associated with an event may be used to ensure that the events in the event stream arrive in the order of increasing timestamp values. This may enable events received in the event stream to be ordered based upon their associated time information. In order to enable this ordering, timestamps may be associated with events in an event stream in a non-decreasing manner such that a later-generated event has a later timestamp than an earlier-generated event.

As another example, if sequence numbers are being used as time information, then the sequence number associated with a later-generated event may be greater than the sequence number associated with an earlier-generated event. In some examples, multiple events may be associated with the same timestamp or sequence number, for example, when the worldly events represented by the data stream events occur at the same time. Events belonging to the same event stream may generally be processed in the order imposed on the events by the associated time information, with earlier events being processed prior to later events.

The time information (e.g., timestamps) associated with an event in an event stream may be set by the source of the stream or alternatively may be set by the system receiving the stream. For example, in certain embodiments, a heartbeat may be maintained on a system receiving an event stream, and the time associated with an event may be based upon a time of arrival of the event at the system as measured by the heartbeat. It is possible for two events in an event stream to have the same time information. It is to be noted that while timestamp ordering requirement is specific to one event stream, events of different streams could be arbitrarily interleaved.

An event stream has an associated schema "S," the schema comprising time information and a set of one or more named attributes. All events that belong to a particular event stream conform to the schema associated with that particular event stream. Accordingly, for an event stream (s, T), the event stream may have a schema 'S' as (<time_stamp>, <attribute(s)>), where <attributes> represents the data portion of the schema and can comprise one or more attributes. For example, the schema for a stock ticker event stream may comprise attributes <stock symbol>, and <stock price>. Each event received via such a stream will have a time stamp and the two attributes. For example, the stock ticker event stream may receive the following events and associated timestamps:

```
...
(<timestamp_N>, <NVDA,4>)
(<timestamp_N+1>, <ORCL,62>)
(<timestamp_N+2>, <PCAR,38>)
(<timestamp_N+3>, <SPOT,53>)
(<timestamp_N+4>, <PDCO,44>)
(<timestamp_N+5>, <PTEN,50>)
...
```

In the above stream, for stream element (<timestamp_N+1>, <ORCL,62>), the event is <ORCL,62> with attributes "stock_symbol" and "stock_value." The timestamp associated with the stream element is "timestamp_N+1". A continuous event stream is thus a flow of events, each event having the same series of attributes.

FIG. 1 depicts a simplified example system or architecture 100 in which techniques for managing the fast path evaluation of Boolean predicates may be implemented. In architecture 100, one or more users 102 (e.g., account holders) may utilize user computing devices 104(1)-(N) (collectively, "user devices 104") to access one or more service provider computers 106 via one or more networks 108. In some aspects, the service provider computers 106 may also be in communication with one or more streaming data source computers 110 and/or one or more databases 112 via the networks 108. For example, the users 102 may utilize the service provider computers 106 to access or otherwise manage data of the streaming data source computers 110 and/or the databases 112. The databases 112 may be relational databases, SQL servers, or the like and may, in some examples, manage archived relations on behalf of the users 102. Additionally, the databases 112 may receive or otherwise store data provided by the streaming data source computers 110. In some examples, the users 102 may utilize the user devices 104 to interact with the service provider computers 106 by providing queries or query statements. Such queries or query statements may then be executed by the service provider computers 106 to process data of the databases 112 and/or incoming data from the streaming data source computers 110. Further, in some examples, the streaming data source computers 110 and/or the databases 112 may be part of an integrated, distributed environment associated with the service provider computers 106.

In some examples, the networks 108 may include any one or a combination of multiple different types of networks, such as cable networks, the Internet, wireless networks, cellular networks, intranet systems, and/or other private and/or public networks. While the illustrated example represents the users 102 accessing the service provider computers 106 over the networks 108, the described techniques may equally apply in instances where the users 102 interact with one or more service provider computers 106 via the one or more user devices 104 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

The user devices 104 may be any type of computing device such as, but not limited to, a mobile phone, a smart phone, a personal digital assistant (PDA), a laptop computer, a desktop computer, a thin-client device, a tablet PC, etc. In some examples, the user devices 104 may be in communication with the service provider computers 106 via the networks 108, or via other network connections. Further, the user devices 104 may also be configured to provide one or more queries or query statements for requesting data of the databases 112 (or other data stores) to be processed.

In some aspects, the service provider computers 106 may also be any type of computing devices such as, but not limited to, mobile, desktop, thin-client, and/or cloud computing devices, such as servers. In some examples, the service provider computers 106 may be in communication with the user devices 104 via the networks 108, or via other network connections. The service provider computers 106 may include one or more servers, perhaps arranged in a cluster, as a server farm, or as individual servers not associated with one another. These servers may be configured to perform or otherwise host features described herein including, but not limited to, the fast path evaluation of Boolean predicates described herein. Additionally, in some aspects, the service provider computers 106 may be configured as part of an integrated, distributed computing environment that includes the streaming data source computers 110 and/or the databases 112.

In one illustrative configuration, the service provider computers 106 may include at least one memory 136 and one or more processing units (or processor(s)) 138. The processor(s) 138 may be implemented as appropriate in hardware, computer-executable instructions, firmware, or combinations thereof. Computer-executable instruction or firmware implementations of the processor(s) 138 may include computer-executable or machine-executable instructions written in any suitable programming language to perform the various functions described.

The memory 136 may store program instructions that are loadable and executable on the processor(s) 138, as well as data generated during the execution of these programs. Depending on the configuration and type of service provider computers 106, the memory 136 may be volatile (such as random access memory (RAM)) and/or non-volatile (such as read-only memory (ROM), flash memory, etc.). The service provider computers 106 or servers may also include additional storage 140, which may include removable storage and/or non-removable storage. The additional storage 140 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 136 may include multiple different types of memory, such as static random access memory (SRAM), dynamic random access memory (DRAM), or ROM.

The memory 136, the additional storage 140, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 136 and the additional storage 140 are all examples of computer storage media.

The service provider computers 106 may also contain communications connection(s) 142 that allow the identity interface computers 120 to communicate with a stored database, another computing device or server, user terminals, and/or other devices on the networks 108. The service provider computers 106 may also include input/output (I/O) device(s) 144, such as a keyboard, a mouse, a pen, a voice input device, a touch input device, a display, one or more speakers, a printer, etc.

Turning to the contents of the memory 136 in more detail, the memory 136 may include an operating system 146 and one or more application programs or services for implementing the features disclosed herein including at least a fast path module 148. As used herein, modules may refer to programming modules executed by servers or clusters of servers that are part of a service. In this particular context, the modules may be executed by the servers or clusters of servers that are part of the service provider computers 106. In some examples, the fast path module 148 may be configured to generate or otherwise provide one or more query graphs 150 for a query or query statement received from a user 102. For example, consider the following simplified, non-limiting example, where a logical expression is expressed as:

$(a>5)\text{OR}(b<10)\text{OR}(c==10).$

In some examples, this logical expression may be expressed by the query graph 150 of FIG. 1. Additionally, a few examples of the operations of the fast path module 148 and/or the service provider computers 106 are described in greater detail below.

Additional types of computer storage media (which may also be non-transitory) that may be present in the service provider computers 106 and/or user devices 104 may include, but are not limited to, programmable random access memory (PRAM), SRAM, DRAM, RAM, ROM, electrically erasable programmable read-only memory (EE-PROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the service provider computers 106 and/or user devices 104. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

FIG. 2 depicts a simplified block diagram 200 with which features of the fast path evaluation of Boolean predicates techniques may be described. As noted above, in some examples, the query graph 150 may be a graphical representation of the logical expression:

$(a>5)\text{OR}(b<10)\text{OR}(c==10).$

In some aspects, based at least in part on the query graph 150, a logical plan may then be generated by a logical plan formation module 202 (e.g., also stored in the memory 136 of the service provider computers 106 of FIG. 1). For example, a first logical plan 204 may be generated to implement each of the predicates and/or logical operators of the query. However, in other examples, "jump" instructions will be utilized to generate the second logical plan 206.

As such, in this non-limiting example, if a >5 is "true" then at runtime the evaluation will jump from [0] to [4] to "true" for the entire expression resulting in a savings of four logical instructions (which in turn can translate to 100s of physical CPU instructions). Additionally, in some examples, the instructions may be added to the logical plan during the code generation phase of query compilation or just before compilation. The algorithm for generating the logical plan can be done in a single pass of the query operators. Further, the tree representing the expressions may be activated at a leaf, such that evaluation may be processed in a bottom-up fashion, reducing the potential for backtracking.

Additionally, in some aspects, the logical plan formation module 202 may be implemented to generate the logical plans 204, 206. For example, in some instances, a filter or other programming application (e.g., a logical plan generation module or the like) may receive or otherwise analyze the source operators of a "select" statement found within a query. For example, the query may be written as such:

```
select c1, c2
    from database (or from a stream, or both)
        where      (c1 == 5)      OR
                   (c1 == 10)     OR
                   (c2 < 8)       AND
                   ...
```

Once analyzed, activated, and/or traversed, the filter may generate the logical plan and/or executable instructions based at least in part on the logical plan (or other set of instructions) for implementing the query with fast path capabilities (e.g., utilizing "jump" statements or the like).

Figure 3:
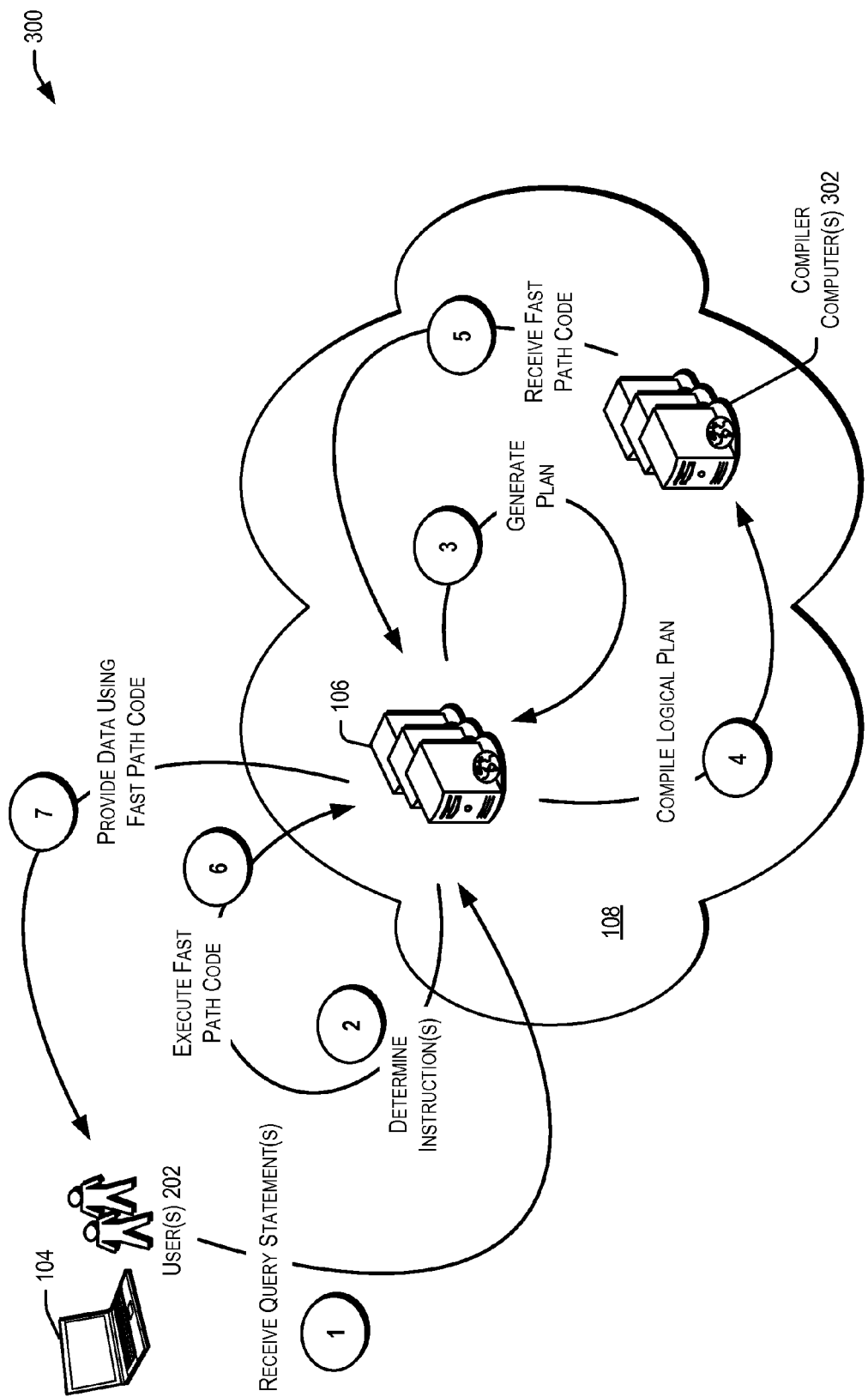
FIG. 3 is a simplified flow diagram illustrating at least some additional features of the fast path evaluation of Boolean predicates described herein, according to at least one example.

FIG. 3 depicts a simplified flow diagram showing one or more techniques 300 for implementing the fast path evaluation of Boolean predicates, according to one example. In FIG. 3, the service provider computers 106 are again shown in communication with the users 102 and/or user devices 104 via the networks 108. Additionally, in some examples, the service provider computers 106 may include or be in communication (e.g., via the networks 108) with one or more compiler computers 302 or compiler modules. While techniques 300 are shown in FIG. 3 in a particular order (including arbitrary sequence numbers), it should be understood that no particular order is necessary and that one or more steps or parts of the techniques 300 may be omitted, skipped, and/or reordered. In at least one non-limiting example, the one or more service provider computers 106 described above with reference to FIGS. 1 and 2 may receive queries and/or query statements from the user devices 104. The query statements may be configured to request processing (e.g., retrieval, storage, deletion, etc.) of database data (e.g., data stored by the databases 112 of FIG. 1). Additionally, in some examples, the service provider computers 106 may also determine a set of instructions for enabling execution of some (but not all) of the logical operators of the query. The set of instructions may be determined based at least in part on the query statement and/or may be based at least in part on a query graph generated from the query (e.g., the query graph 150 of FIGS. 1 and 2). Additionally, in some examples, the instructions may resemble the logical plan 204.

In some examples, the service provider computers 106 may also generate one or more logical plans (e.g., the logical plan 206 of FIG. 2) based at least in part on the set of instructions generated. As desired, however, the service provider computers may generate the logical plan directly from the query graph 150 and/or the query statement. In some instances, the service provider computers 106 may pass the logical plan to the compiler computers 302 for compilation. However, in other examples, a compiler of the service provider computers 106 may be configured to compile the logical plan without passing the plan to a separate computing system. At least in response to compilation of the logical plan, the service provider computers 106 may receive fast path code. The fast path code, in some examples, may enable fast path evaluation of the Boolean predicates from the query statement at runtime, as discussed above. The service provider computers 106 and/or another computing system may execute the fast path code. As such, data of the databases 112 and/or the streaming data source computers 110 may be processed based at least in part on the fast path code. Finally, in some examples, data may be provided (e.g., when the query includes a "get" or other retrieval command) to the users 102 based at least in part on the executed fast path code.

Figure 4:
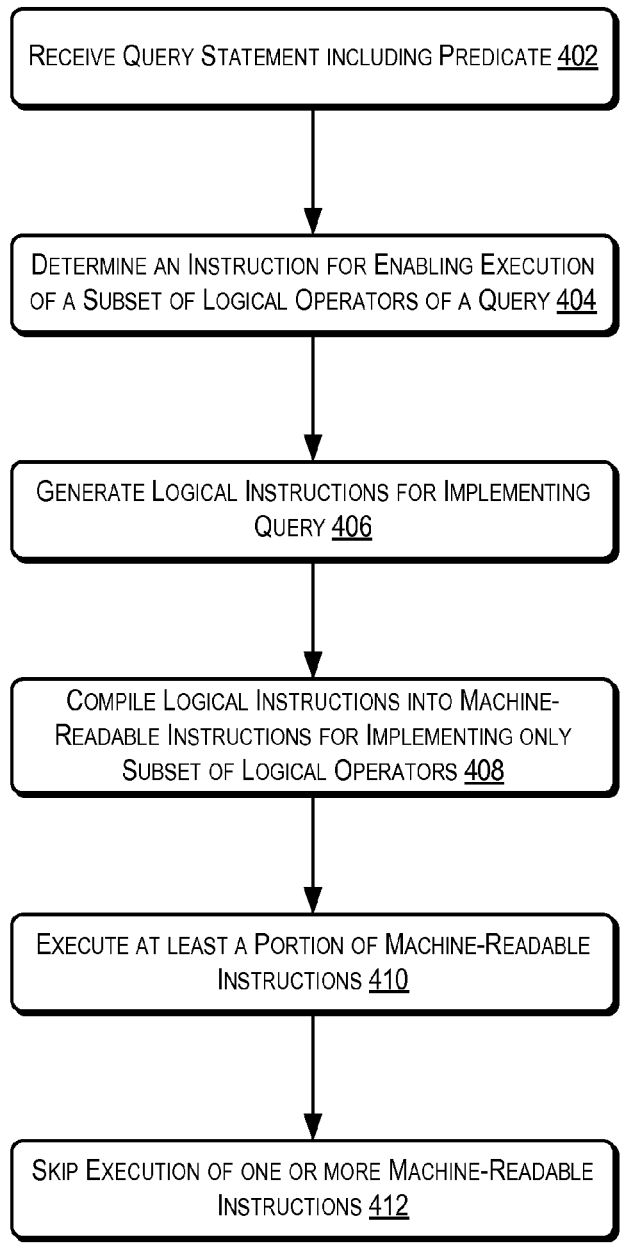
FIG. 4 is a simplified process flow illustrating at least some features of the fast path evaluation of Boolean predicates described herein, according to at least one example.
Figure 5:
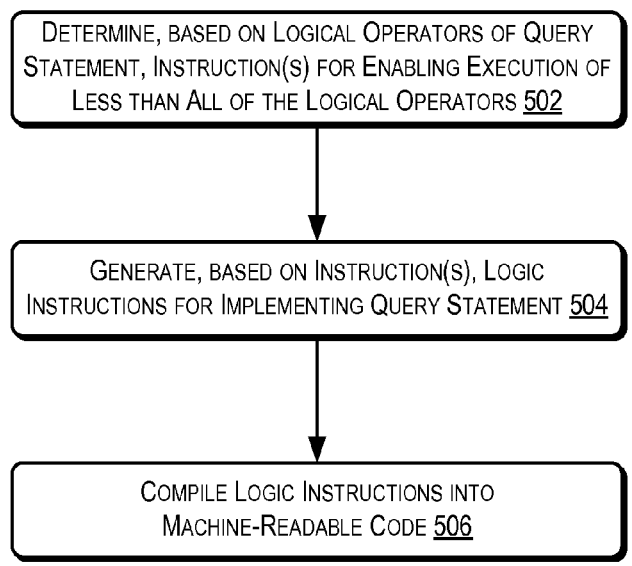
FIG. 5 is another simplified process flow illustrating at least some features of the fast path evaluation of Boolean predicates described herein, according to at least one example.
Figure 6:
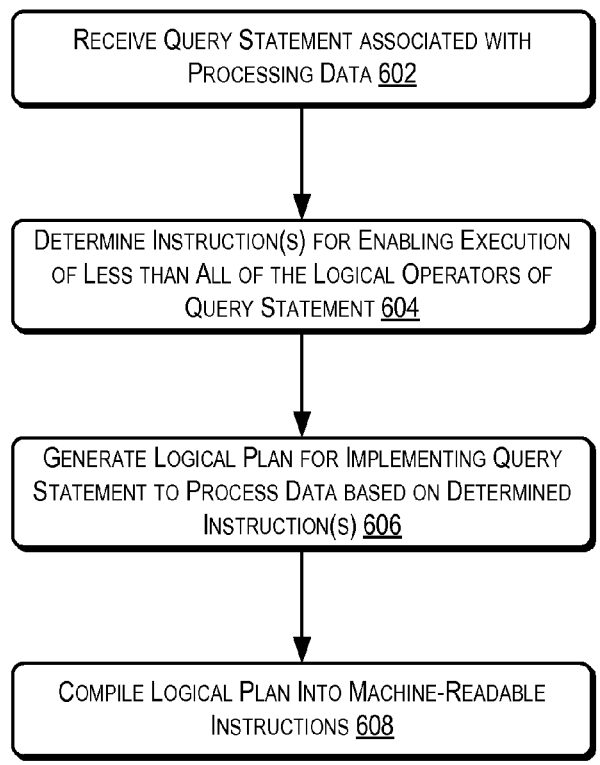
FIG. 6 is another simplified process flow illustrating at least some features of the fast path evaluation of Boolean predicates described herein, according to at least one example.

FIGS. 4-6 illustrate example flow diagrams showing respective processes 400, 500, and 600 for implementing the fast path evaluation of Boolean predicates techniques described herein. These processes 400, 500, 600 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 106 (e.g., utilizing at least one of the fast path module 148 of FIG. 1 and/or the logical plan formation module 202 of FIG. 2) shown in FIGS. 1-3 may perform the process 400 of FIG. 4. The process 400 may begin by including receiving a query statement including a predicate at 402. As noted, the query statement may be received from a user and correspond to a request to process data of a database, of a stream, or other collection of managed or received data. The predicate may include logical operators and may be configured to evaluate to either "true," or "false." In some examples, at 404, the process 400 may include determining an instruction (or set of instructions) for enabling evaluation of a subset of the logical operators of the query statement. In some examples, the subset of the logical operators to be evaluated may be less than all of the logical operators. In other words, utilization of the fast path evaluation methods may include skipping execution of some of the logical operators. At 406, the process 400 may also include generating one or more logical instructions for implementing the query. For example, a logical plan may be formulated based at least in part on the determined instructions.

The process 400 may also include compiling the logical instructions into machine-readable instructions for implementing only a subset of the logical operators at 408. For example, the logical plan may have been generated in such a way as to skip execution of some of the logical operators of a query; however, the compilation of the instructions at 408 may actually enable the skipping at runtime. At 410, the process 400 may include executing at least a portion of the machine-readable instructions. Execution of the machine-readable instructions may include actually performing the steps outlined by the compiled code (e.g., at runtime). Further, in some examples, the process 400 may end at 412 by including skipping execution of one or more machine-readable instructions (e.g., Boolean predicates that do not need to be evaluated at least due to knowledge of the result without executing each instruction).

FIG. 5 illustrates an example flow diagram showing process 500 for implementing the fast path evaluation of Boolean predicates techniques described herein. The one or more service provider computers 106 (e.g., utilizing at least one of the fast path module 148 of FIG. 1 and/or the logical plan formation module 202 of FIG. 2) shown in FIGS. 1-3 may perform the process 500 of FIG. 5. The process 500 may begin at 502 by including determining, based at least in part on logical operators of a query statement, one or more instructions for enabling evaluation of less than all of the logical operators. As noted, determining the instructions may be based at least in part on generating a query graph and/or a logical plan. The logical plan may include the one or more different "jump" instructions described above. Additionally, at 504, the process 500 may include generating, based at least in part on the determined instructions, one or more logic instructions for implementing the query. The process 500 may end at 506 by including compiling the logic instructions into machine-readable code.

FIG. 6 illustrates an example flow diagram showing process 600 for implementing the fast path evaluation of Boolean predicates techniques described herein. The one or more service provider computers 106 (e.g., utilizing at least one of the fast path module 148 of FIG. 1 and/or the logical plan formation module 202 of FIG. 2) shown in FIGS. 1-3 may perform the process 600 of FIG. 6. The process 600 may begin by including receiving a query statement associated with data to be processed on behalf of a user or other computing system at 602. At 604, the process 600 may also include a query graph for enabling evaluation of less than all of the logical operators of the query statement. Additionally, in some examples, the process 600 may also include generating a logical plan for implementing the query statement at 606. In some cases, the logical plan may be generated based at least in part on the query graph (and in a bottom-up fashion). However, in other examples, the logical plan may be generated based at least in part on the query alone, the logical operators of the query, and/or the query graph that represents the query. At 608, the process 600 may end by including compiling the logical plan into machine-readable instructions.

Illustrative methods and systems for implementing the fast path evaluation of Boolean predicates are described above. Some or all of these systems and methods may, but need not, be implemented at least partially by architectures and processes such as those shown at least in FIGS. 1-6 above.

Figure 7:
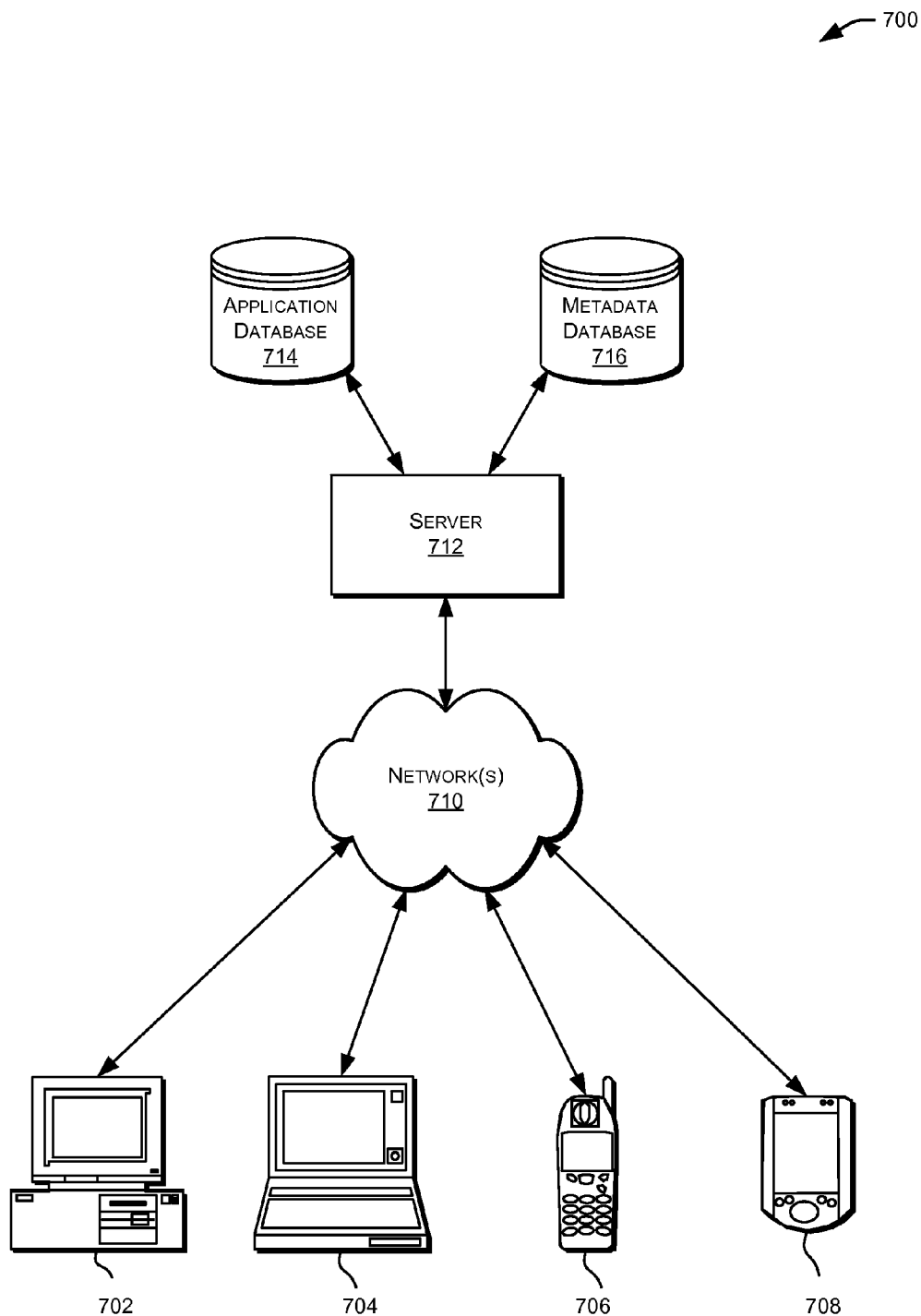
FIG. 7 is a simplified block diagram illustrating components of a system environment that may be used in accordance with an embodiment of the fast path evaluation of Boolean predicates described herein, according to at least one example.

FIG. 7 is a simplified block diagram illustrating components of a system environment 700 that may be used in accordance with an embodiment of the present disclosure. As shown, system environment 700 includes one or more client computing devices 702, 704, 706, 708, which are configured to operate a client application such as a web browser, proprietary client (e.g., Oracle Forms), or the like over one or more networks 710 (such as, but not limited to, networks similar to the networks 108 of FIGS. 1 and 3). In various embodiments, client computing devices 702, 704, 706, and 708 may interact with a server 712 over the networks 710.

Client computing devices 702, 704, 706, 708 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 702, 704, 706, and 708 may be any other electronic device, such as a thin-client computer, Internet-enabled gaming system, and/or personal messaging device, capable of communicating over a network (e.g., network 710 described below). Although exemplary system environment 700 is shown with four client computing devices, any number of client computing devices may be supported. Other devices such as devices with sensors, etc. may interact with server 712.

System environment 700 may include networks 710. Networks 710 may be any type of network familiar to those skilled in the art that can support data communications using any of a variety of commercially-available protocols, including without limitation TCP/IP, SNA, IPX, AppleTalk, and the like. Merely by way of example, network 710 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 700 also includes one or more server computers 712 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 712 may be adapted to run one or more services or software applications described in the foregoing disclosure. For example, server 712 may correspond to a server for performing processing described above according to an embodiment of the present disclosure.

Server 712 may run an operating system including any of those discussed above, as well as any commercially available server operating system. Server 712 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 700 may also include one or more databases 714, 716. Databases 714, 716 may reside in a variety of locations. By way of example, one or more of databases 714, 716 may reside on a non-transitory storage medium local to (and/or resident in) server 712. Alternatively, databases 714, 716 may be remote from server 712, and in communication with server 712 via a network-based or dedicated connection. In one set of embodiments, databases 714, 716 may reside in a storage-area network (SAN) familiar to those skilled in the art. Similarly, any necessary files for performing the functions attributed to server 712 may be stored locally on server 712 and/or remotely, as appropriate. In one set of embodiments, databases 714, 716 may include relational databases, such as databases provided by Oracle, that are adapted to store, update, and retrieve data in response to SQL-formatted commands.

Figure 8:
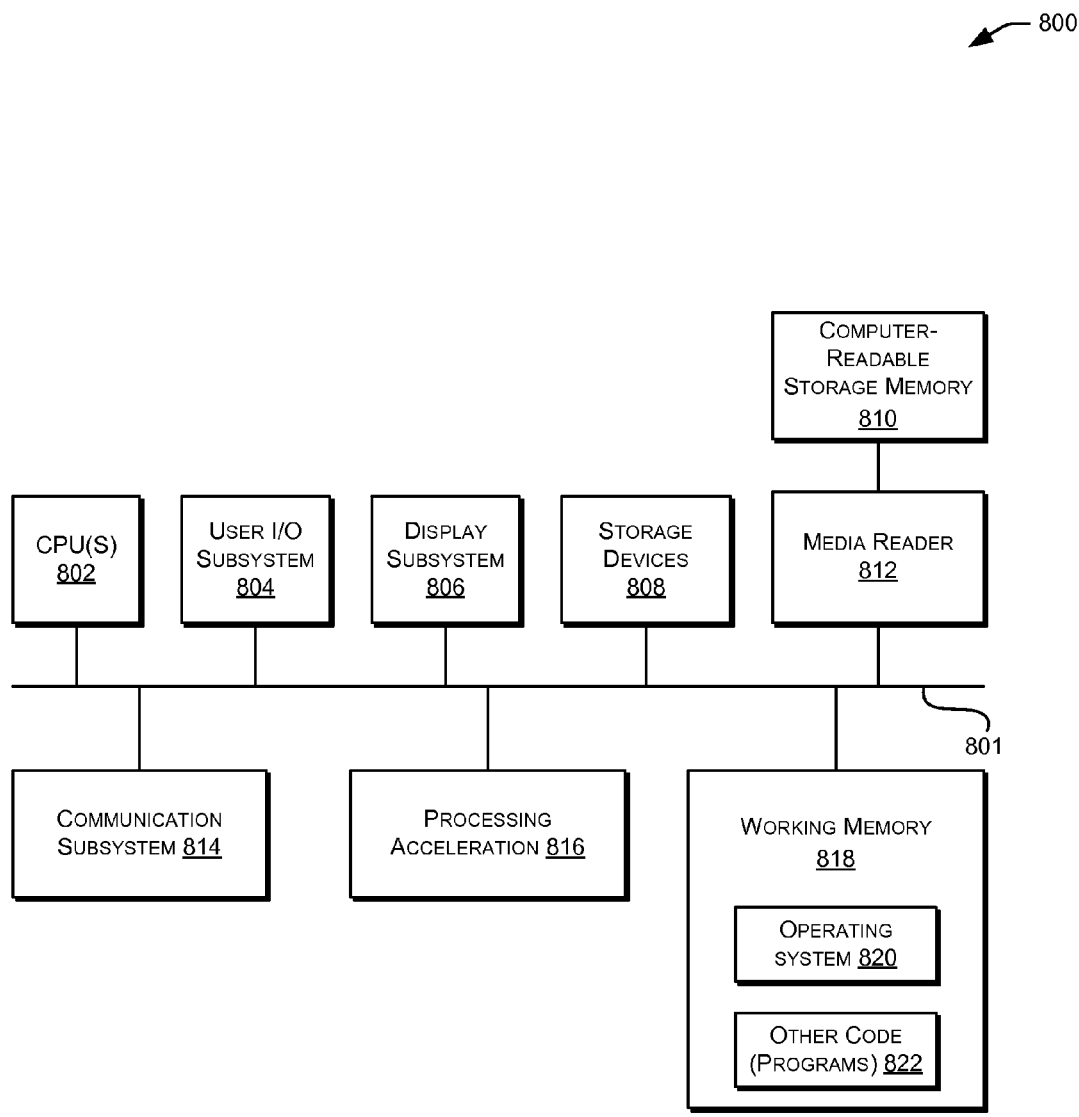
FIG. 8 is a simplified block diagram illustrating a computer system that may be used in accordance with embodiments of the fast path evaluation of Boolean predicates described herein, according to at least one example.

FIG. 8 is a simplified block diagram of a computer system 800 that may be used in accordance with embodiments of the present disclosure. For example service provider computers 106 may be implemented using a system such as system 800. Computer system 800 is shown comprising hardware elements that may be electrically and/or communicatively coupled via a bus 801. The hardware elements may include one or more central processing units (CPUs) 802, one or more input devices 804 (e.g., a mouse, a keyboard, etc.), and one or more output devices 806 (e.g., a display device, a printer, etc.). Computer system 800 may also include one or more storage devices 808. By way of example, the storage device(s) 808 may include devices such as disk drives, optical storage devices, and solid-state storage devices such as a random access memory (RAM) and/or a read-only memory (ROM), which can be programmable, flash-updateable and/or the like.

Computer system 800 may additionally include a computer-readable storage media reader 812, a communications subsystem 814 (e.g., a modem, a network card (wireless or wired), an infra-red communication device, etc.), and working memory 818, which may include RAM and ROM devices as described above. In some embodiments, computer system 800 may also include a processing acceleration unit 816, which can include a digital signal processor (DSP), a special-purpose processor, and/or the like.

Computer-readable storage media reader 812 can further be connected to a computer-readable storage medium 810, together (and, optionally, in combination with storage device(s) 808) comprehensively representing remote, local, fixed, and/or removable storage devices plus storage media for temporarily and/or more permanently containing computer-readable information. Communications system 814 may permit data to be exchanged with network 812 and/or any other computer described above with respect to system environment 800.

Computer system 800 may also comprise software elements, shown as being currently located within working memory 818, including an operating system 820 and/or other code 822, such as an application program (which may be a client application, Web browser, mid-tier application, RDBMS, etc.). In an exemplary embodiment, working memory 818 may include executable code and associated data structures used for relying party and open authorization-related processing as described above. It should be appreciated that alternative embodiments of computer system 800 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to, volatile and non-volatile (non-transitory), removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope. Illustrative methods and systems for providing features of the present disclosure are described above. Some or all of these systems and methods may, but need not, be implemented at least partially by architectures such as those shown in FIGS. 1-7 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A system, comprising:
a memory storing a plurality of instructions; and
one or more processors configured to access the memory, wherein the one or more processors are further configured to execute the plurality of instructions to at least:
receive event data from an event stream;
identify a continuous query language query for querying the event data of the event stream;
generate a first logical plan comprising one or more logical operators of the continuous language query;
determine, based at least in part on the one or more logical operators of the continuous query language query in the first logical plan, a first instruction for enabling evaluation of a subset of the one or more logical operators of the continuous query language query;
generate, based at least in part on the first instruction in the first logical plan, a second logical plan for implementing the continuous query language query, the second logical plan comprising at least one conditional instruction for skipping evaluation of at least one or more expressions associated with the one or more logical operators after a first expression comprising the one or more expressions has been evaluated;
compile at least the second logical plan into machine-readable instructions for implementing the subset of the logical operators of the continuous query language query in the first logical plan; and
execute the machine-readable instructions, the machine-readable instructions comprising the conditional instruction for skipping evaluation, at a runtime, of the one or more expressions associated with the subset of the logical operators of the continuous query language query, the conditional instruction identifying, at the runtime, a function comprising a list of input arguments, and the list of input arguments comprising at least one of an input operand indicating a result of execution of a previous instruction in the second logical plan, a storage parameter indicating a storage location to jump to if an expression represented by the input operand satisfies a condition, or a result parameter indicating a result location of execution of the conditional instruction.

2. The system of claim 1, wherein the first instruction, when executed, is configured to generate a query graph for the continuous query language query.

3. The system of claim 1, wherein the subset includes less than all of the logical operators of the continuous query language query.

4. The system of claim 1, wherein the one or more processors are further configured to execute the plurality of instructions to at least execute at least a portion of the machine-readable instructions.

5. The system of claim 4, wherein executing at least a portion of the machine-readable instructions includes at least skipping execution of one or more of the machine-readable instructions.

6. The system of claim 1, wherein the one or more processors are further configured to execute the plurality of instructions to at least receive the continuous query language query as a query statement including at least a predicate.

7. The system of claim 6, wherein the predicate comprises a clause for evaluating to true or false.

8. The system of claim 7, wherein the clause comprises a "where" clause, and wherein the "where" clause includes at least one of a logical operator or a Boolean predicate.

9. The system of claim 1, wherein the continuous query language query is configured to reference data corresponding to an event processor.

10. The system of claim 1, wherein the second logical plan further comprises instructions to evaluate at least a first expression of the one or more expressions associated with the one or more logical operators in the first logical plan.

11. A non-transitory computer-readable memory storing a plurality of instructions executable by one or more processors, the plurality of instructions comprising:
  instructions that cause the one or more processors to receive event data from an event stream;
  instructions that cause the one or more processors to identify a continuous query language query statement for querying the event data of the event stream;
  instructions that cause the one or more processors to generate a first logical plan comprising one or more logical operators of the continuous language query statement;
  instructions that cause the one or more processors to determine, based at least in part on the one or more logical operators of the continuous query language query statement in the first logical plan, a first instruction for enabling evaluation of less than all of the one or more logical operators of the continuous query language query statement;
  instructions that cause the one or more processors to generate, based at least in part on the first instruction in the first logical plan, a second logical plan for implementing the continuous query language query statement, the second logical plan comprising at least one conditional instruction for skipping evaluation of at least one or more expressions associated with the one or more logical operators after a first expression comprising the one or more expressions has been evaluated;
  instructions that cause the one or more processors to compile the second logical plan into machine-readable code for implementing the one or more logical operators of the continuous query language query statement in the first logical plan; and
  instructions that cause the one or more processors to execute the machine-readable instructions, the machine-readable instructions comprising the conditional instruction for skipping evaluation, at a runtime, of the one or more expressions associated with the subset of the logical operators of the continuous query language query, the conditional instruction identifying, at the runtime, a function comprising a list of input arguments, and the list of input arguments comprising at least one of an input operand indicating a result of execution of a previous instruction in the second logical plan, a storage parameter indicating a storage location to jump to if an expression represented by the input operand satisfies a condition, or a result parameter indicating a result location of execution of the conditional instruction.

12. The computer-readable memory of claim 11, wherein the continuous query language query statement includes at least one predicate.

13. The computer-implemented method of claim 12, wherein the continuous query language query statement is configured to retrieve at least one of historical or streaming data.

14. The computer-implemented method of claim 12, wherein the predicate includes one or more other logical operators.

15. A computer-implemented method, comprising:
  receiving event data from an event stream;
  receiving, by a computing system, a continuous query language query statement for processing the event data of the event stream;
  generating a first logical plan comprising one or more logical operators of the continuous language query;
  generating, based at least in part on the one or more logical operators of the continuous query language query statement in the first logical plan, a query graph for enabling evaluation of less than all of the one or more logical operators of the continuous query language query statement;
  generating, based at least in part on the query graph, a second logical plan for implementing the continuous query language query statement to process the event data of the event stream, the second logical plan comprising at least one conditional instruction for skipping evaluation of at least one or more expressions associated with the one or more logical operators after a first expression comprising the one or more expressions has been evaluated;
  compiling, by the computing system, the second logical plan into machine-readable instructions for implementing the one or more logical operators of the continuous query language query statement in the first logical plan; and
  executing the machine-readable instructions, the machine-readable instructions comprising the conditional instruction for skipping evaluation, at a runtime, of the one or more expressions associated with the subset of the logical operators of the continuous query language query, the conditional instruction identifying, at the runtime, a function comprising a list of input arguments, and the list of input arguments comprising at least one of an input operand indicating a result of execution of a previous instruction in the second logical plan, a storage parameter indicating a storage location to jump to if an expression represented by the input operand satisfies a condition, or a result parameter indicating a result location of execution of the conditional instruction.

16. The computer-implemented method of 15, further comprising executing at least a portion of the machine-readable instructions.

17. The computer-implemented method of 16, wherein executing at least a portion of the machine-readable instructions includes at least jumping one or more of the machine-readable instructions.

18. The computer-implemented method of claim 16, wherein executing at least a portion of the machine-readable instructions comprises executing all of the machine-readable instructions except for at least one of the machine-readable instructions.

19. The computer-implemented method of claim 15, wherein the instructions include at least a jump_if_true or a jump_if_false instruction.

20. The computer-implemented method of claim 15, wherein the first logical plan is generated by traversing the query graph upward starting from a bottom node of the query graph.

21. The computer-implemented method of claim 15, wherein the second logical plan includes a jump_if_true statement associated with an "or" operator following at least the first expression comprising the one or more expressions or a jump_if_false statement associated with an "and" operator following at least the first expression comprising the one or more expressions.

* * * * *

UNITED STATES PATENT AND TRADEMARK OFFICE
CERTIFICATE OF CORRECTION

PATENT NO. : 9,563,663 B2  
APPLICATION NO. : 13/764560  
DATED : February 7, 2017  
INVENTOR(S) : Vikram Shukla and Anand Srinivasan Page 1 of 1

It is certified that error appears in the above-identified patent and that said Letters Patent is hereby corrected as shown below:

On the Title Page

Item (56) References Cited:

Pg. 6, Right Column, Line 12: Please delete "Serverver" and insert --Server--.

Pg. 6, Right Column, Line 30: Please delete "(pri nter)." and insert --(printer).--.

Pg. 10, Right Column, Line 52: Please delete "Integrationand" and insert --Integration and--.

Pg. 11, Left Column, Line 13: Please delete "Actio" and insert --Action--.

Pg. 12, Left Column, Line 33: Please delete "Patentabiilty" and insert --Patentability--.

Pg. 12, Right Column, Line 29: Please delete "intemational" and insert --international--.

In the Claims

Column 17, Claim 13, Line 53: Delete "computer-implemented method" and insert --computer-readable memory--.

Column 17, Claim 14, Line 57: Delete "computer-implemented method" and insert --computer-readable memory--.

Column 18, Claim 16, Line 38: Delete "of" and insert --of claim--.

Column 18, Claim 17, Line 41: Delete "of" and insert --of claim--.

Signed and Sealed this  
First Day of May, 2018

Andrei Iancu  
*Director of the United States Patent and Trademark Office*